United States Patent [19]

Houser et al.

[11] Patent Number: 5,774,859
[45] Date of Patent: Jun. 30, 1998

[54] INFORMATION SYSTEM HAVING A SPEECH INTERFACE

[75] Inventors: Peter B. Houser, Poway, Calif.; Mark E. Schutte, Sugar Hill, Ga.; Gloria J. Majid, San Diego, Calif.

[73] Assignee: Scientific-Atlanta, Inc., Norcross, Ga.

[21] Appl. No.: 367,997

[22] Filed: Jan. 3, 1995

[51] Int. Cl.⁶ ............................... H04N 7/00; G10L 9/00
[52] U.S. Cl. ............................................................ 704/275
[58] Field of Search ............................. 395/2.79, 2.84; 704/275, 270

[56] References Cited

U.S. PATENT DOCUMENTS

| | | | |
|---|---|---|---|
| 4,516,207 | 5/1985 | Moriyama et al. | 364/424 |
| 4,641,292 | 2/1987 | Tunnell et al. | 367/198 |
| 4,677,569 | 6/1987 | Nakano et al. | 364/513.5 |
| 4,706,121 | 11/1987 | Young | 358/142 |
| 4,776,016 | 10/1988 | Hansen | 381/42 |
| 4,977,455 | 12/1990 | Young | 358/142 |
| 4,989,253 | 1/1991 | Liang et al. | 381/110 |
| 5,086,385 | 2/1992 | Launey et al. | 364/188 |
| 5,151,789 | 9/1992 | Young | 358/194.1 |
| 5,157,760 | 10/1992 | Akagiri | 395/2 |
| 5,199,080 | 3/1993 | Kimura et al. | 381/110 |
| 5,230,023 | 7/1993 | Nakano | 381/110 |
| 5,267,323 | 11/1993 | Kimura | 381/110 |
| 5,303,148 | 4/1994 | Mattson et al. | 364/413.01 |
| 5,335,276 | 8/1994 | Thompson et al. | 380/21 |
| 5,335,313 | 8/1994 | Douglas | 395/2.84 |
| 5,353,121 | 10/1994 | Young et al. | 348/563 |
| 5,479,266 | 12/1995 | Young et al. | 358/335 |
| 5,479,268 | 12/1995 | Young et al. | 358/335 |
| 5,557,319 | 9/1996 | Gurusami et al. | 348/11 |

FOREIGN PATENT DOCUMENTS 4351094  5/1991  Japan ............................... G10L 3/00

OTHER PUBLICATIONS

Lefkowitz, "Voice–Recognition Home TV Coming This Year; Service Merges Computer, Phone, and Cable Technologies (BBN Hark Systems Corp, Time Warner Cable, Full Service Network)," Computer Shopper, v. 15, n2, p.68(1), Feb. 1995.

"Voice Operated Controls and Switches Are Developed," Veterans Administration Journal Announcement GRA18422, Abstract, Jul., 1984.

Sugaya et al., "Voice Remote Controlled TV Set," COMPCON 79 Proceedings using microprocessors extending our reach, 1979.

Dawson, "Time Warner Pursues Voice as New Remote", Multichannel News, Jan. 9, 1995, pp. 31 and 34.

*Primary Examiner*—David R. Hudspeth
*Assistant Examiner*—Susan Wieland
*Attorney, Agent, or Firm*—Kenneth M. Massaroni; Kelly A. Gardner

[57] ABSTRACT

A system for controlling a device such as a television and for controlling access to broadcast information such as video, audio, and/or text information is disclosed. The system includes a first receiver for receiving utterances of a speaker, a second receiver for receiving vocabulary data defining a vocabulary of utterances, and a processor for executing a speech recognition algorithm using the received vocabulary data to recognize the utterances of the speaker and for controlling the device and the access to the broadcast information in accordance with the recognized utterances of the speaker.

10 Claims, 28 Drawing Sheets

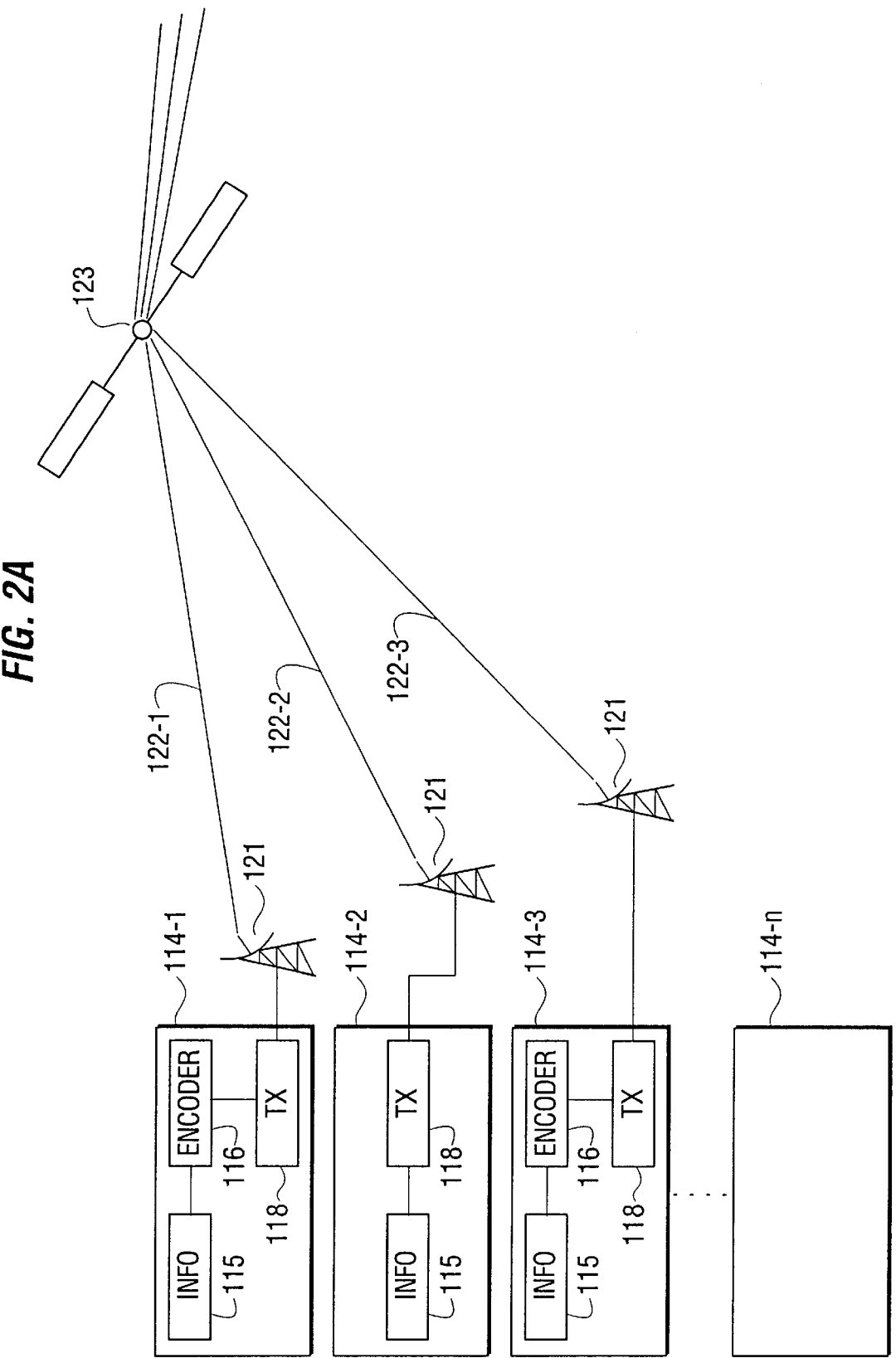

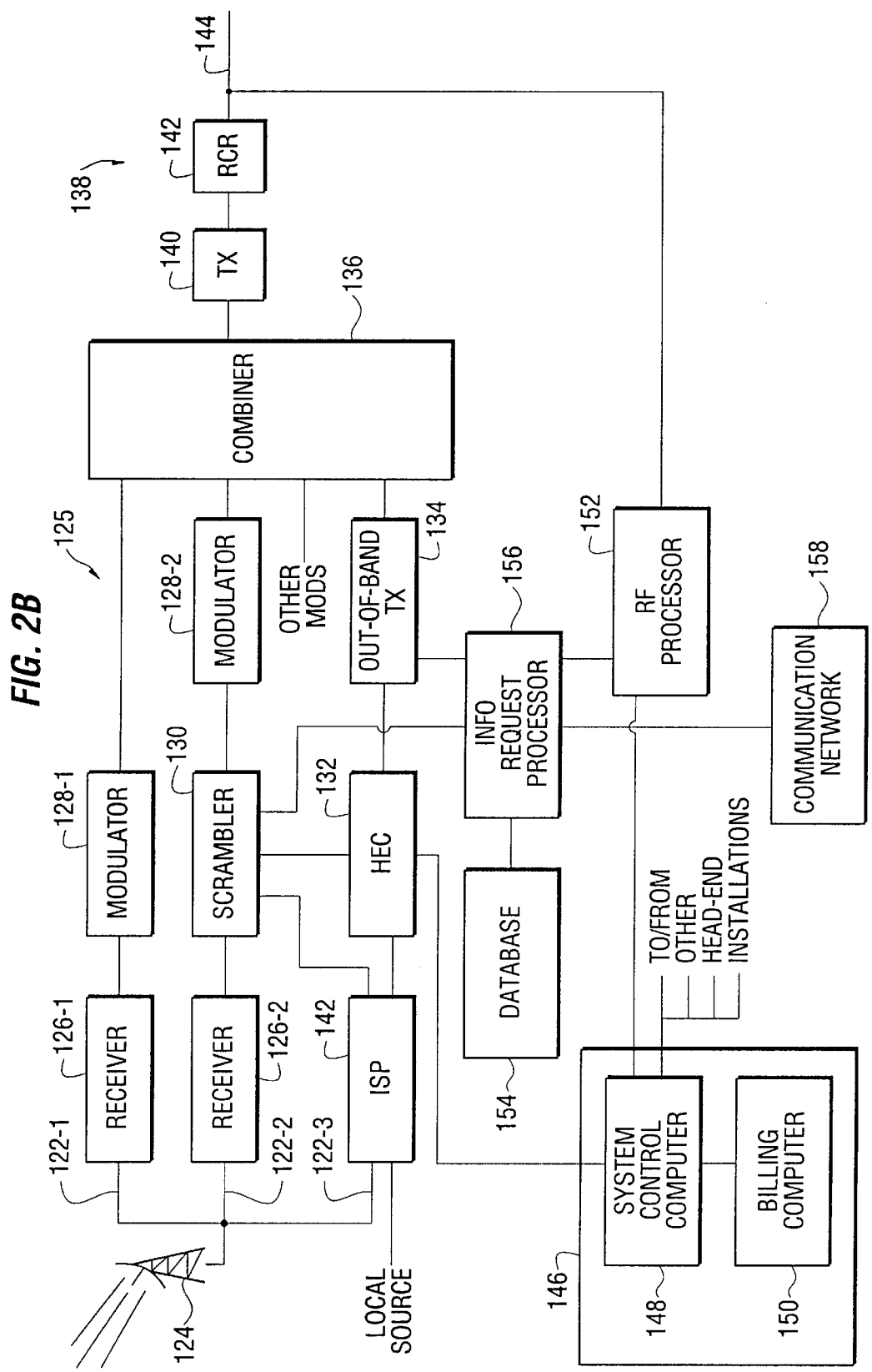

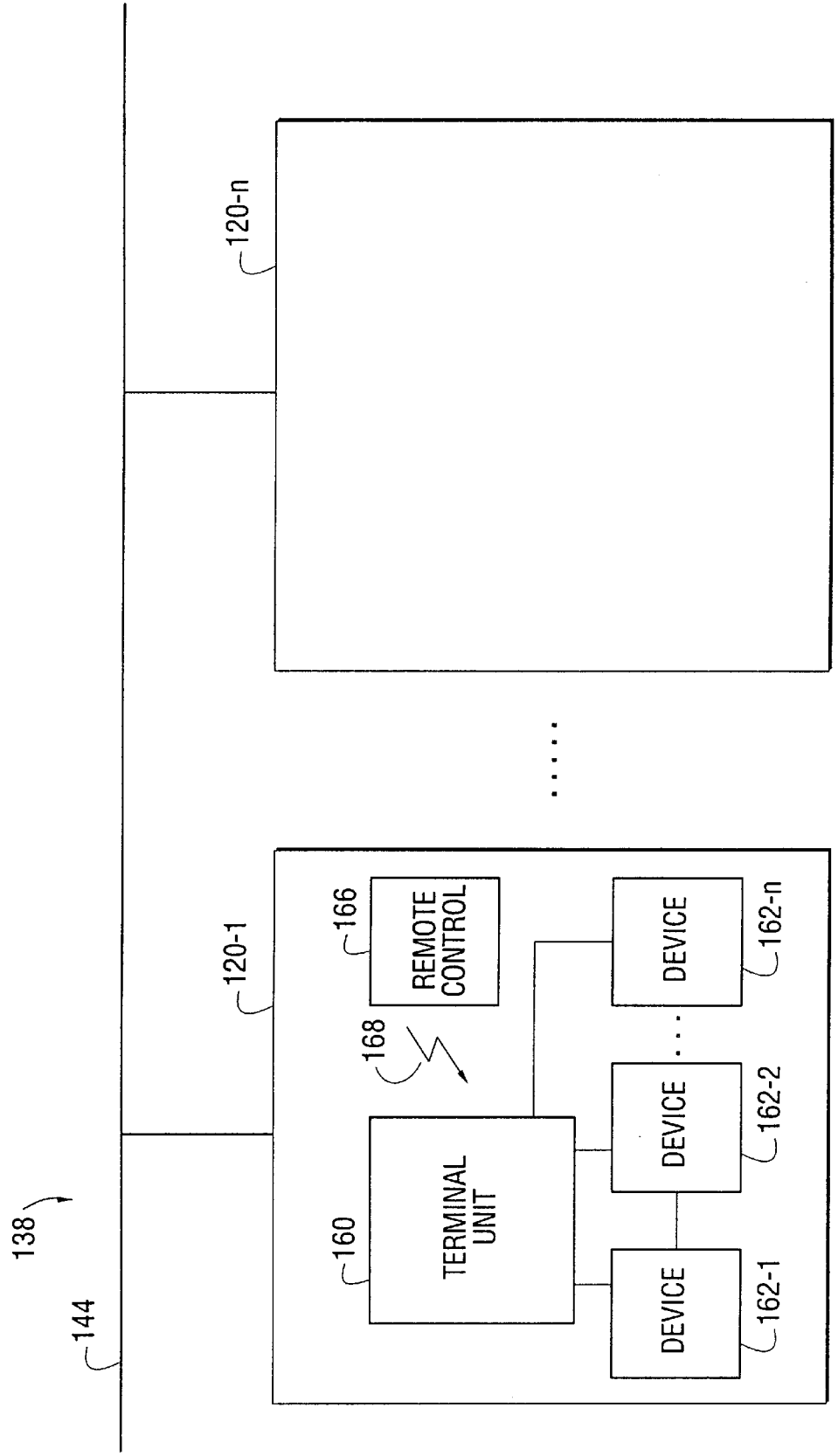

| 03/05 | 7:00 PM | 7:30 PM | 8:00 PM | 8:30 PM |
|---|---|---|---|---|
| WXIA 14 | HOLLYWO SQUARES | GILLIGANS ISLAND | BRADY BUNCH | TOM AND JERRY |
| HBO 15 | TERMINATOR 2 [R] [CC] | | HOME ALONE [PG] [CC] | |
| KABC 16 | TERMINA- TOR 2 | WRESTLING | | |
| ESPN 17 | GOLF | WIMBLEDON | | BOWLING |
| SHOW 18 | BAD NEWS BEARS [PG] | | | CITIZEN KANE |
| TMC 19 | ONE GOOD COOP [R] | | | INVISIBLE MAN |
| CURRENT TIME: 7:15 PM    CURRENT DATE: 03/05 | | | | |
| PRESS [INFO] FOR DETAILS, [SELECT] TO TUNE. PRESS [MENU] TO EXIT. | | | | |

FIG. 12A

```
MAIN MENU

1.   PAY PER VIEW
2.   WHAT'S ON CABLE
3.   MESSAGES/INFORMATION
4.   FAVORITE CHANNELS
5.   VCR PROGRAM TIMER
6.   SLEEP TIMER
7.   PARENTAL CONTROL
8.   CABLE TERMINAL SETUP
9.   EXIT

PLEASE MAKE SELECTION.
```

FIG. 12B

```
WHAT'S ON CABLE

1.   VIEWING CHANNEL
2.   FAVORITE CHANNEL
3.   CHANNEL LISTINGS
4.   CATEGORIES
5.   EXIT

PLEASE MAKE SELECTION.
```

FIG. 12C

```
            VIEWING GUIDE

1.  TUNE TV TO PROGRAM
    2.  RECORD PROGRAM
    3.  PROVIDE INFORMATION
        ON PROGRAM
    4.  EXIT

PLEASE MAKE SELECTION.
```

FIG. 12D

```
YOU'VE CHOSEN:
      ESPN CH 17
SEE THE WORLD'S FINEST GOLFER'S
IN FIRST ROUND ACTION AT THE
U.S. OPEN.
STARTS: 7:00PM   ENDS: 7:30PM

RECORD:
      1. ONE-TIME
      2. DAILY
      3. WEEKLY
      4. EXIT

PLEASE MAKE SELECTION.
```

FIG. 12E

VCR IS SCHEDULED TO RECORD:

| FAVORITE CHANNEL GUIDE | | | | |
|---|---|---|---|---|
| | 7:00 PM | 7:30 PM | 8:00 PM | 8:30 PM |
| KABC 16 | TERMINATOR 2 | WRESTLING | | |
| ESPN 17 | GOLF | WIMBELDON | | BOWLING |
| DIS 29 | JEOPARDY | NATIONAL GEOGRAPHIC | | MICKEY MOUSE |
| CURRENT TIME: 6:51 PM | | | | DATE: 3/5/94 |

FIG. 12G

```
14 WXIA      19 TMC
15 HBO       29 DIS
16 KABC
17 ESPN
18 SHOW

1. VIEWING GUIDE
   2. MAIN MENU
   3. EXIT

PLEASE MAKE SELECTION.
```

FIG. 12H

```
              CATEGORIES

1.    CHILDREN/EDUCATION/SCIENCE
2.    DRAMA/ROMANCE
3.    ENTERTAINMENT/VARIETY
4.    MOVIES
5.    NEWS/TALK/MAGAZINE
6.    SPECIALS/MINI-SERIES
7.    PRE-RECORDED SPORTS
8.    LIVE SPORTS
9.    ACTION/MYSTERY/HORROR
10.   COMEDY
11.   MISCELLANEOUS
12.   EXIT

PLEASE MAKE SELECTION.
```

FIG. 12I

```
              LIVE SPORTS

1.    BASEBALL
         2.    BASKETBALL
         3.    SOCCER
         4.    MORE LISTINGS
         5.    EXIT

PLEASE MAKE SELECTION.
```

FIG. 12J

```
                BASEBALL

CH          PROGRAM NAME 1. 02          CUBS vs METS
      2. 07          BRAVES vs REDS
      3. EXIT

PLEASE MAKE SELECTION.
```

FIG. 12K

```
        VCR PROGRAM TIMER

1.   USE PLUS CODES
    2.   SET PROGRAM TIMER
    3.   CHANGE PROGRAM TIMER
    4.   CLEAR PROGRAM TIMER
    5.   EXIT

PLEASE MAKE SELECTION.
```

FIG. 12L

```
            PLUS CODES

STATE THE CODE ONE DIGIT
    AT A TIME

_ _ _ _ _ _ _ _ _ _

STATE "OK" WHEN YOU ARE DONE.
    STATE "EXIT" TO EXIT.
```

FIG. 12M

PROGRAM TIMER

1. EPG PROGRAM VCR
2. VOICE PROGRAM VCR
3. EXIT

PLEASE MAKE SELECTION.

FIG. 12N 1.
2.
3.
4.
5.

SELECT PROGRAM NUMBER.

FIG. 12O

STATE    "DAY"

EXAMPLE:  SATURDAY

FIG. 12P

PROGRAM 1

RECORD ON JUNE 11, 1994

STATE:

"START HOUR, START MINUTE, AM OR PM"

EXAMPLE: "EIGHT ZERO ZERO PM"

FIG. 12Q

START TIME: 9:05 PM

STATE:

"STOP HOUR, STOP MINUTE, AM OR PM"

FIG. 12R

STOP TIME: 10:35 PM

STATE: CHANNEL

FIG. 12S

PROGRAM 1

START TIME:    9:05 PM
STOP TIME:     10:35 PM
DATE: JUNE 11, 1994
CHANNEL: 07
SPEED
    1. SP
    2. EP
    3. LP

PLEASE MAKE SELECTION.

FIG. 12T

PROGRAM 1

START TIME:    9:05 PM
STOP TIME:     10:35 PM
DATE: JUNE 11, 1994
CHANNEL: 07
SPEED: SP

STATE "OK" IF THIS
INFORMATION IS CORRECT.

FIG. 12U

YOUR VCR WILL TAPE THE
PROGRAMMING ON:

JUNE 11, 1994
FROM 9:05 TO 10:35 PM
ON CH 07
AT SP SPEED

FIG. 13A

SEARCH...

FIG. 13B

SEARCH...
ONLY FOOTBALL

47 ITEMS HAVE BEEN FOUND.

FIG. 13C

```
SEARCH...
ONLY FOOTBALL
ONLY SPORTS

42 ITEMS HAVE BEEN FOUND.
```

FIG. 13D

```
SEARCH...
ONLY FOOTBALL
ONLY SPORTS
ONLY TODAY

23 ITEMS HAVE BEEN FOUND.
```

FIG. 13E

SEARCH...

ONLY FOOTBALL
ONLY SPORTS
ONLY TODAY
ONLY AFTER ELEVEN AM

19 ITEMS HAVE BEEN FOUND.

FIG. 13F

SEARCH...

ONLY FOOTBALL
ONLY SPORTS
ONLY TODAY
ONLY AFTER ELEVEN AM
ONLY BEFORE SIX PM

12 ITEMS HAVE BEEN FOUND.

FIG. 13G

```
                    LIST

1.  PENN STATE - NOTRE DAME
             CHANNEL 10      12:30 PM
         2.  OHIO STATE - MICHIGAN
             CHANNEL 5       1:00 PM
         3.  ~~~
         4.  ~~~
         5.  MORE
         6.  EXIT

PLEASE MAKE SELECTION.
```

FIG. 14

```
                 PAY-PER-VIEW

1.   TERMINATOR 2
         2.   FORREST GUMP
         3.   THE LION KING
         4.   PULP FICTION
         5.   SPEED
         6.   MORE
         7.   EXIT

PLEASE MAKE SELECTION.
```

INFORMATION SYSTEM HAVING A SPEECH INTERFACE

BACKGROUND OF THE INVENTION

1. Technical Field

The present invention generally relates to an information system having a speech interface and, more particularly, to a subscription information system including a subscriber terminal unit which provides for control of electronic devices and access to information services by spoken commands.

2. Description of the Related Art

The volume of information and number of features being made available to subscribers in information systems such as subscription television systems are continuously increasing. For example, the advent of optical fiber networks and links to telecommunication networks enables an almost limitless supply of information and features to be provided to subscribers. Already subscription television systems are being used for addressed message transmissions, pay-per-view programming, impulse pay-per-view programming, favorite channel features, and parental control. Cable television system operators may also provide text services such as news articles, sports scores, stock market quotations, and weather reports. Relatively new features such as video game delivery, wide area network access, home shopping, travel reservations service, home banking, energy management, video conferencing and other such services are also being provided.

Recently, some companies have begun offering electronic television schedules for purchase by subscription television providers who, in turn, provide the schedules to their subscribers. The schedules contain a listing of television programs by time and channel, and are typically displayed as a grid on the television screen. Such a system is shown in PCT Publication No. WO 92/04801, applied for by Insight Telecast, Inc. (hereinafter "the Insight system") and incorporated herein by reference. That publication describes a display system for maneuvering a cursor through a television schedule. The system also describes that a subscriber can choose a program for recording by moving a cursor to the selected program; the system will automatically program the subscriber's video cassette recorder.

Also recently, so-called near-video-on-demand services have been introduced. These services provide a simulation of the videotape rental experience. One such system is described in Walter, U.S. Pat. No. 5,168,353, incorporated herein by reference. Walker describes in column 4, lines 18–27 that a converter may be enabled to descramble two channels carrying the same program at staggered intervals. This allows returning to the same portion of the video after a pause equal to the staggered time interval. The Walker patent gives as an example a subscriber ordering a program that begins at 8:00 p.m. The converter unscrambles the 8:00 showing as well as the 8:15 showing so that the viewer may return to the same point in the program after a fifteen minute break.

This increase in information and features has generally resulted in a corresponding increase in the complexity of the subscriber's interface with the system. Since the subscriber's "comfort level" with an interface for accessing information and features will often determine whether the subscriber will utilize the information and features, there is a need for user-friendly interfaces. An interface such as that described in commonly assigned copending application Ser. No. 07/800,836 entitled "Method and Apparatus for Providing an On-Screen User Interface for a Subscription Television Terminal", incorporated herein by reference, can greatly enhance the ability of a user to access available features. The system described in that application significantly reduces the number of key presses and data entries required to utilize available features; moreover, a key pad is designed in such a way as to group keys together in a manner to facilitate their use. However, even with such an improved interface, certain tasks are simply not well-suited for execution using a keypad on a subscriber terminal unit or an associated remote control. For example, while a subscriber might be very interested in using an EPG to determine the channel number and time for the next showing of a particular television show or to find all movies being shown in the next week starring a particular actress, such tasks are not easily implemented using menu screens and key presses.

SUMMARY OF THE INVENTION

The present invention adds a speech recognition interface to a subscriber terminal unit in an information system for implementing spoken control of electronic devices at the subscriber location and of access to information transmitted to the subscriber terminal unit. The speech recognition interface enhances the interface of the subscriber with the information system by allowing control using language which is naturally spoken by the subscriber. Such natural language control affords ease of use as well as permitting the implementation of tasks which are not easily implemented using menu screens and key presses.

In accordance with one aspect of the instant invention, a system for controlling a device includes a first receiver for receiving utterances of a speaker, a second receiver for receiving vocabulary data defining a vocabulary of utterances, and a processor for executing a speech recognition algorithm using the received vocabulary data to recognize the utterances of the speaker and for controlling the device in accordance with the recognized utterances of the speaker.

In accordance with another aspect of the invention, a method for controlling a device includes the steps of receiving utterances of a speaker, receiving vocabulary data defining a vocabulary of utterances, using the received vocabulary data to recognize the utterances of the speaker, and controlling the device in accordance with the recognized utterances of the speaker.

In accordance with another aspect of the invention, a system for controlling access to broadcast information includes a first receiver for receiving utterances of a speaker, a second receiver for receiving vocabulary data defining a vocabulary of utterances, and a processor for executing a speech recognition algorithm using the received vocabulary data to recognize the utterances of the speaker and for controlling access to the broadcast information in accordance with the recognized utterances of the speaker.

In accordance with another aspect of the invention, a method for controlling access to broadcast information includes the steps of receiving utterances of a speaker, receiving vocabulary data defining a vocabulary of utterances, using the received vocabulary data to recognize the utterances of the speaker, and controlling access to the broadcast information in accordance with the recognized utterances of the speaker.

In accordance with yet another aspect of the invention, a system for controlling a device and for controlling access to broadcast information includes a first receiver for receiving utterances of a speaker, a second receiver for receiving vocabulary data defining a vocabulary of utterances, and a processor for executing a speech recognition algorithm using the received vocabulary data to recognize the utterances of the speaker and for controlling the device and the access to the broadcast information in accordance with the recognized utterances of the speaker.

In accordance with yet another aspect of the invention, a method for controlling a device and for controlling access to broadcast information includes the steps of receiving utterances of a speaker, receiving vocabulary data defining a vocabulary of utterances, using the received vocabulary data to recognize the utterances of the speaker, and controlling the device and the access to the broadcast information in accordance with the recognized utterances of the speaker.

In accordance with yet another aspect of the invention, a system for controlling a device includes a transmitter for transmitting vocabulary data for defining a vocabulary of utterances; and a terminal unit including a first receiver for receiving utterance data of a speaker, a second receiver for receiving the transmitted vocabulary data, and a processor for executing a speech recognition algorithm using the received vocabulary data to recognize utterances of the speaker and for controlling said device in accordance with the recognized utterances of the speaker.

In accordance with yet another aspect of the invention, a method for controlling a device includes the steps of transmitting vocabulary data for defining a vocabulary of utterances, receiving utterance data of a speaker, receiving the transmitted vocabulary data, using the received vocabulary data to recognize utterances of the speaker, and controlling the device in accordance with the recognized utterances of the speaker.

In accordance with still another aspect of the invention, a system for controlling access to broadcast information includes a transmitter for transmitting vocabulary data defining a vocabulary of utterances and a terminal unit including a first receiver for receiving utterance data of a speaker, a second receiver for receiving the transmitted vocabulary data, and a processor for executing a speech recognition algorithm using the received vocabulary data to recognize utterances of the speaker and for controlling access to the broadcast information in accordance with the recognized utterances of the speaker.

In accordance with still another aspect of the invention, a method for controlling access to broadcast information includes the steps of transmitting vocabulary data for defining a vocabulary of utterances, receiving utterance data of a speaker, receiving the transmitted vocabulary data, using the received vocabulary data to recognize utterances of the speaker, and accessing the information in accordance with the recognized utterances of the speaker.

In accordance with still another aspect of the invention, a system for controlling a device and for controlling access to broadcast information includes a transmitter for transmitting vocabulary data defining a vocabulary of utterances and a terminal unit including a first receiver for receiving utterance data of a speaker, a second receiver for receiving the transmitted vocabulary data, and a processor for executing a speech recognition algorithm using the received vocabulary data to recognize utterances of the speaker and for controlling the device and the access to the broadcast information in accordance with the recognized utterances of the speaker.

In accordance with still another aspect of the invention, a method for controlling a device and for controlling access to broadcast information includes the steps of transmitting vocabulary data for defining a vocabulary of utterances, receiving utterance data of a speaker, receiving the transmitted vocabulary data, using the received vocabulary data to recognize utterances of the speaker, and controlling the device and the access to the information in accordance with the recognized utterances of the speaker.

In accordance with still another aspect of the invention, a system for controlling a television receiver to allow user selection of broadcast programs from program schedule information includes a first receiver for receiving the program schedule information, a second receiver for receiving utterances of a user, and a processor for executing a speech recognition algorithm to recognize the utterances of the user and for selecting broadcast programs from the program schedule information in accordance with the recognized utterances of the user.

In accordance with another aspect of the invention, a remote control for transmitting utterance data to a receiver includes a microphone for receiving utterances of a speaker, an analog-to-digital converter for converting utterance signals from the microphone to digital utterance signals, a digital signal processor for extracting time-variant spectral characteristics of the digital utterance signals, and a transmitter for transmitting the time-variant spectral characteristics to the receiver.

In accordance with still another aspect of the invention, a subscription television system includes a head-end installation for transmitting vocabulary data for defining a vocabulary of spoken commands and a subscriber terminal unit connected to a television. The subscriber terminal unit includes a first receiver for receiving spoken command data, a second receiver for receiving the vocabulary data transmitted from the head-end installation, and a processor for executing a speech recognition algorithm using the vocabulary data to recognize spoken commands and for controlling the television in accordance with the recognized spoken commands.

In accordance with another aspect of the invention, an information broadcasting center for broadcasting information to at least one terminal unit includes a first transmitter for transmitting text information and a second transmitter for transmitting phonemic data corresponding to at least a portion of the text information.

In accordance with another aspect of the invention, a subscriber terminal unit includes a tuner for tuning channels of a television signal, each channel carrying a respective program identified by a program title, a memory for storing a speech recognition algorithm for recognizing spoken program titles, and a processor for executing the speech recognition algorithm to recognize a program title spoken by a subscriber and for generating a tuner control signal for controlling the tuner to tune to the channel carrying the program corresponding to the recognized program title.

These and other features and advantages of the present invention will be better understood from a reading of the following detailed description in conjunction with the accompanying drawings.

BRIEF DESCRIPTION OF THE DRAWINGS

FIGS. 2A, 2B, and 2C are a block diagram of a subscription television system in which the instant invention is implemented.

FIGS. 12A–12U are diagrams illustrating screens generated during the speech recognition operation.

FIGS. 13A–13G are diagrams illustrating additional screens generated during the speech recognition operation.

FIG. 14 is a diagram illustrating an additional screen generated during the speech recognition operation.

DETAILED DESCRIPTION

The following conventions will be used throughout this detailed description. The <>symbols will be used to denote keypad commands input via the keypads to be described below, e.g., <Enter>. Quotation marks and capital letters will be used to designate spoken commands, e.g., "RECORD" or "POWER ON." Capital letters and italics will be utilized to indicate variables such as channel numbers, etc.

Figure 1:
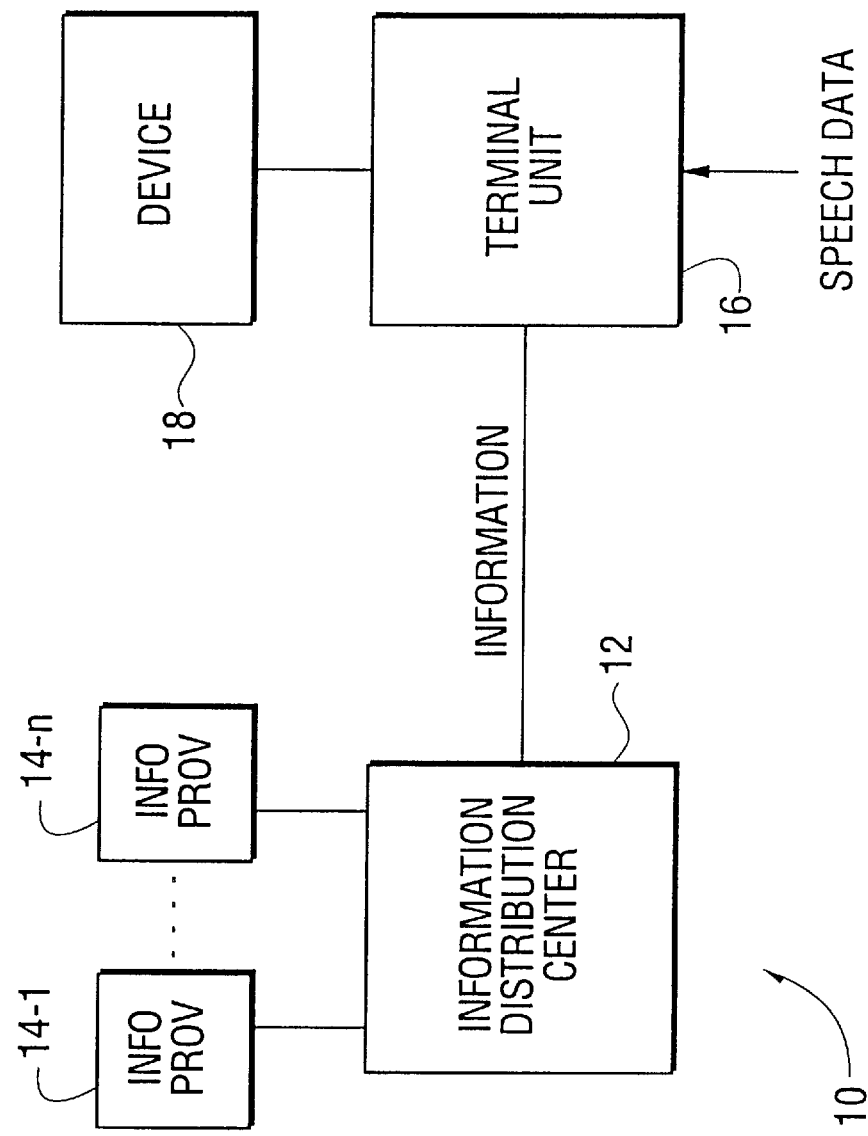
FIG. 1 is a generalized block diagram of an information system in accordance with the instant invention.

FIG. 1 is a generalized block diagram of an information system 10 in accordance with the instant invention. Information system 10 includes an information distribution center 12 which receives information from one or more remotely located information providers 14-1, . . . , 14-n and supplies or broadcasts this information to a terminal unit 16. "Information" as used herein includes, but is not limited to, analog video, analog audio, digital video, digital audio, text services such as news articles, sports scores, stock market quotations, and weather reports, electronic messages, electronic program guides, database information, software including game programs, and wide area network data. Alternatively or in addition, information distribution center 12 may locally generate information and supply this locally generated information to terminal unit 16.

The information transmitted by information distribution center 12 to terminal unit 16 includes vocabulary data representative of a vocabulary of spoken sounds or words ("utterances"). This vocabulary provides, for example, for spoken control of a device 18 and for spoken control of access to the information transmitted by information distribution center 12. Specifically, terminal unit 16 receives vocabulary data from information distribution center 12 and speech ("utterance") data from a user. Terminal unit 16 includes a processor for executing a speech recognition algorithm for comparing the vocabulary data and the spoken command data to recognize, for example, commands for controlling device 18 or commands for accessing information transmitted by information distribution center 12. Terminal unit 16 then appropriately generates a command for controlling device 18 or for accessing information transmitted by information distribution center 12. As used herein, a speech recognition algorithm refers to an algorithm which converts spoken audio input into text or corresponding commands. A speaker verification algorithm refers to an algorithm which verifies the claimed identity of a speaker based upon a sample of the claimant's speech. A speaker identification algorithm refers to an algorithm which identifies a speaker from a list of previously sampled alternatives based upon audio input from a speaker. A speaker identification algorithm may be used, for example, to limit the ability to control the device and/or access information to particular speakers.

The vocabulary data transmitted from information distribution center 12 to terminal unit 16 may, for example, be phoneme data. A phoneme is a member of the set of the smallest units of speech that serve to distinguish one utterance from another in a language or dialect. Each sound or spoken word in the vocabulary may thus be represented by a combination of phonemes. Alternatively, the vocabulary data may be template data generated by having a person or persons speak each sound or word. Each spoken sound or word in the vocabulary may thus be represented by a respective corresponding template. It should be noted that although the system of FIG. 1 illustrates a system in which information from information providers 14-1, . . . , 14-n and the vocabulary data are transmitted over the same communication link, the invention is not limited in this respect. Thus, information from information service providers 14-1, . . . , 14-n and the vocabulary data may be transmitted over different communications links.

Many different arrangements may be utilized to provide the speech data to terminal unit 16. In a first illustrative, but non-limiting, arrangement, a remote control is provided which includes a wireless microphone or related transducer for transmitting sounds or words spoken by a user to terminal unit 16 via electrical, optical, or radio frequency signals. Terminal unit 16 then includes a receiver, an analog front end for conditioning the received signal, a codec for performing an analog-to-digital conversion of the conditioned signal, and an interface circuit for interfacing to the processor. By conditioning is meant noise cancellation, noise reduction, filtering, and other known techniques for, for example, modifying a received electrical signal originating from a voice transducer. In a second illustrative arrangement, a remote control is provided with a microphone, an analog receiver for conditioning the sound signal from the microphone, a codec for performing an analog-to-digital conversion of the conditioned signal, and a transmitter for transmitting the digitized sound data signal to terminal unit 16 using, for example, infrared or radio frequency signals. Terminal unit 16 then includes a receiver for receiving the digitized sound data signal and an interface circuit for interfacing to the processor. The digitized sound data signal will typically require a data transfer rate of at least 64 k bits per second. In a third illustrative arrangement, a remote control is provided with a microphone, an analog receiver for conditioning the sound signal from the microphone, a codec for performing an analog-to-digital conversion of the conditioned signal, a digital signal processor for analyzing the digitized sound signal to extract spectral data, and a transmitter for transmitting the spectral data to terminal unit 16 using, for example, infrared signals. Terminal unit 16 then includes a receiver for receiving the spectral data and an interface circuit for interfacing to the processor. Because spectral data is transmitted in this third arrangement as opposed to the digitized sound data in the second arrangement, the data rate is much lower, i.e., less than 10 k bits per second. Because spectral analysis is performed in the remote control, the loading of the processor of terminal unit 16 is reduced during the recognition operation by 30–50% as compared with the second arrangement. In a fourth illustrative arrangement, terminal unit 16 is provided with a microphone, an analog front end to condition the sound signal from the microphone, a codec to perform an analog-to-digital conversion of the conditioned signal, and an interface circuit for interfacing to the processor. In a fifth illustrative arrangement, terminal unit 16 is provided with a microphone, an analog front end to condition the sound signal from the microphone, a codec to perform an analog-to-digital conversion of the conditioned signal, a digital signal processor for analyzing the digitized sound signal to extract spectral data, and an interface circuit for interfacing to the processor bus. The digital signal processor in the fifth arrangement is used to lower loading on the processor of terminal unit 16 as compared with the fourth arrangement. These various arrangements are illustrative only and other arrangements may be utilized to provide speech data to terminal unit 16 within the scope of the instant invention.

The vocabulary data transmitted by information distribution center 12 may define commands which a user may speak to control device 18. Device 18 may be any device which is capable of being operated in response to user-supplied commands and the instant invention is not limited in this respect. Thus, device 18 may be, for example, a television, a stereo receiver, a video cassette recorder, an audio cassette recorder, a compact disc (CD) player, a video disc player, a video game player, or a computer. As an illustration, assume that device 18 is a television which is plugged into a switched power outlet of terminal unit 16 and that it is desired to allow a user to control the on and off switching of the television by speaking the commands "POWER ON" and "POWER OFF", respectively. Information distribution center 12 would then transmit to terminal unit 16 phonemic or template vocabulary data defining a command vocabulary having the words POWER, ON, and OFF. When the user says either "POWER ON" or "POWER OFF" and the speech data corresponding to the command is provided to terminal unit 16 using any of the arrangements described above, the processor of terminal unit 16 executes the speech recognition algorithm to compare the spoken command with the phonemic or template data representing the command vocabulary in order to recognize the spoken command. Terminal unit 16 then appropriately controls device 18, i.e., either switching the television on or off. Since the television is plugged into a switched power outlet of terminal unit 16 as described above, the on and off switching of the television is implemented internally to terminal unit 16. However, the instant invention is also applicable to situations where the recognized command is passed to device 18 for execution via a communication link. Such a communication link may, for example, be an infrared link, an RF link, a coaxial cable, a telephone network, a satellite system, or an optical fiber and the invention is not limited in this respect.

The vocabulary data may alternatively or additionally define words and commands which a user may speak to access information transmitted from information distribution center 12. This feature permits a user to perform tasks which would be very difficult to perform with a menu driven user interface. For example, this feature can be used to perform a keyword search of the titles of news articles transmitted from information distribution center 12 using a "SEARCH KEYWORDS" command. Specifically, information distribution center 12 determines which individual words are to serve as the keywords and generates a phonemic or template "dictionary" which maps these keywords to phonemes or templates. Information distribution center 12 transmits the news articles and the dictionary to terminal unit 16 where they are stored in memory. For each keyword, terminal unit 16 generates the corresponding phonemic or template string using the dictionary. The string is then "registered" with the speech recognition algorithm as a single recognizable utterance, i.e, it becomes a basic part of the speech recognition algorithm's vocabulary. The registration includes specifying an identifier for the phonemic or template string which could be a numerical value or the keyword itself. When the user then speaks the "SEARCH KEYWORDS" command, a display dedicated to this command is provided, for example, on a display device associated with terminal unit 16 or on a television connected to terminal unit 16. The user may then speak a command "ONLY KEYWORD" to limit the search by terminal unit 16 to news articles transmitted by information distribution center 12 having the spoken KEYWORD in the title. The user may then speak additional keywords to refine the search or may view the news articles having the spoken keyword in the title. It can readily be seen that performing such a task using a conventional menu driven user interface would be extremely difficult.

Information distribution center 12 may also transmit to terminal unit 16 grammar information which specifies how the words and commands may be used. For example, "POWER ON" might be an allowable command, but "ON POWER" might not. The grammar information may also include context-specific rules. For example, "RECORD" might be allowed only when a VCR is present and turned on. It should be noted that some or all of the grammar and context specific rules may be permanently stored in memory of terminal unit 16.

FIGS. 2A, 2B, and 2C are a block diagram of a subscription television system 100 in which the instant invention is incorporated. It will of course be apparent that the instant invention may be applied to information systems other than a subscription television system and the invention is not limited in this respect. A subscription television system 100 provides information to a plurality of subscriber locations, e.g., 120-1, . . . , 120-n (see FIG. 2C). The information may include, but is not limited to analog video, analog audio, digital video, digital audio, text services such as news articles, sports scores, stock market quotations, and weather reports, electronic messages, electronic program guides, database information, software including game programs, and wide area network data. Referring to FIG. 2A, subscription television system 100 includes a plurality of information providers 114-1, . . . , 114-n each of which may supply one or more of the information types identified above. For example, information provider 114-2 includes an information source 115 for providing an analog television signal to a transmitter 118. Transmitter 118 is coupled to a satellite uplink 121 which transmits an analog television signal 122-2. Information providers 114-1 and 114-3 each provide digital information from an information source 115 to a respective encoder 116 that generates an encoded data stream for transmission. Information source 115 of information providers 114-1 and 114-3 may be a memory such as an optical memory for storing information. If either of information providers 114-1 and 114-3 provides a variety of information, e.g., a plurality of different game programs or different types of text services or a plurality of digital television or audio programs, encoder 116 may multiplex the information to generate a multiplexed data stream for transmission. The data stream from encoder 116 is supplied to a transmitter 118 and then to a satellite uplink 121. By way of example in FIG. 2A, the encoder 116 operated by information provider 114-1 generates a digital data signal 122-1 and the encoder 116 operated by information provider 114-3 generates a digital data signal 122-3. Each signal 122-1, 122-2, and 122-3 is transmitted via a satellite 123 to a head-end installation 125 (see FIG. 2B). It is understood that there may be many information providers in the system of the instant invention, and therefore a plurality of signals may be transmitted via satellite 123 to locations such as headend installation 125. Although not shown, signals may be received at locations other than a head-end installation, such as, for example, at the locale of a direct broadcast satellite (DBS) subscriber. In addition, while the link between the information providers and the head-end installation is shown as a satellite link, the invention is not limited in this respect. Accordingly, this link may, for example, be a coaxial cable, a telephone network, a satellite system, a radio frequency (RF) link, or an optical fiber or any combination thereof. Further, while the information providers of FIG. 2A are remotely located from head-end installation 125, one or more information providers may be physically located at the same site as head-end installation 125.

Referring to FIG. 2B, a satellite down-link 124 at head-end installation 125 provides received signals 122-1, 122-2, and 122-3. Head-end installation 125 serves as a communications hub, interfacing to the various information providers, and connecting them on a conditional basis to subscriber locations 120-1, . . . , 120-n. For example, received digital data signal 122-1 is supplied to a receiver 126-1 and then to a modulator 128-1, where it is modulated onto a distinct cable channel. Modulator 128-1 may employ any suitable modulation technique such as quadrature partial response (QPR) modulation. Received analog television signal 122-2 is supplied to a receiver 126-2, then to a scrambler 130 for scrambling, and then to a modulator 128-2, where it is modulated into a distinct cable channel. As will be discussed in detail below, scrambler 130 also inserts in-band data into analog television signal 122-2. It will be apparent that additional receivers, modulators, and, optionally, scramblers may be similarly provided for digital and analog information signals received from other information providers, either local or remote (not shown).

Received digital data signal 122-3 is provided to an information signal processor (ISP) 142 so that it may be transmitted using so-called in-band or out-of-band transmissions. Other data streams (not shown) from other information providers may also be provided to ISP 142. ISP 142 is responsible for receiving the one or more data signals and then transmitting data to the subscriber terminal locations as will now be described. ISP 142 provides data to scrambler 130. ISP 142 may provide data to additional scramblers depending on factors such as the amount of data to be transmitted and the speed at which the data must be supplied and updated. Data is repetitively sent out by scrambler 130. If there is only one scrambler and a large amount of data, the repetition rate will be slow. Use of more than one scrambler allows the data repetition rate to increase.

Specifically, scrambler 130 places data in-band for transmission to subscribers, along with scrambling the associated analog television signal 122-2. In one arrangement, data is placed in the vertical blanking interval of the television signal, but data may be placed elsewhere in the signal and the invention is not limited in this respect. For example, data could be amplitude modulated on a sound carrier as is well known. As herein described, in-band transmission means the transmission of data within the video television channel comprising both audio and video carriers. Thus, the data from ISP 142 may be transmitted by amplitude modulation on the sound carrier, hereinafter in-band audio data, or in the vertical or horizontal blanking periods of an analog television signal, hereinafter in-band video data. ISP 142 may also be arranged to supply the data for transmission during unused portions a digital data stream such as an MPEG compressed video data stream.

ISP 142 can also receive and/or generate information locally. For example, ISP 142 may generate messages for transmission to subscribers concerning upcoming events or service interruptions or changes. If received from an information service provider, the information may either be transmitted as received or be reformatted by ISP 142, then supplied to scrambler 130 for transmission to subscribers.

ISP 142 also passes information to a head-end controller ("HEC") 132, which is connected to scrambler 130 and an out-of-band transmitter 134. Although HEC 132 is illustrated as being connected to the same scrambler as ISP 142, HEC 132 may in fact be connected to a different scrambler or scramblers. HEC 132 may conveniently be a Scientific-Atlanta Model 8658 for controlling transmission of data to scrambler 130 and out-of-band transmitter 134. As noted above, scrambler 130 places data in-band for transmission to subscribers, along with scrambling an associated television signal. Out-of-band transmitter 134 transmits information on a separate carrier, i.e., not within a channel. In one implementation, the out-of-band carrier is at 108.2 MHz, but other out-of-band carriers may also be used. The information transmitted under the control of HEC 132 may, for example, be descrambling data. In one arrangement, information is inserted in each vertical blanking interval to indicate the type of scrambling employed in the next video field. Scrambling systems are well known in the art. For example, sync suppression scrambling, video inversion scrambling, and the like, or some combination of scrambling techniques may be used. Further, authorization information can be transmitted. Authorization information authorizes subscribers to receive certain channels or programs. Information from ISP 142 and/or HEC 132 may also be transmitted over non-scrambled channels via data repeaters (not shown) such as a Scientific-Atlanta Model 8556-100 data repeater as either in-band audio or video data.

Some of the transmitted information is global, i.e., it is transmitted to every subscriber. For example, the descrambling data may be a global transmission. It is noted that just because each subscriber receives the descrambling data does not mean that each subscriber terminal unit can descramble a received signal. Rather, only authorized subscriber terminal units are capable of descrambling the received signal. On the other hand, some information transmissions may be addressed transmissions. For example, authorization information would normally be addressed to individual subscribers. That is, when transmitted, the data will have an address (for example, a subscriber terminal unit serial number) associated with it. The addressed subscriber terminal unit receives the information and responds accordingly. Other subscriber terminal units will ignore the data. Further, there can be group addressed data, which will affect groups of subscriber terminal units.

The outputs of modulators 128-1, 128-2, any additional modulators, and out-of-band transmitter 134 are supplied to a combiner 136 that combines the individual channels into a single wide-band signal that is then transmitted via distribution network 138 to a plurality of subscriber locations 120-1, . . . , 120-n (see FIG. 2C). Distribution network 138 may include, for example, one or more optical transmitters 140, one or more optical receivers 142, and a coaxial cable 144.

As indicated in FIG. 2B, subscription television system 100 may include a plurality of head-end installations which each provide information to locations in a particular city or geographic region. A central control 146 may be provided to coordinate the operation of various head-end installations in subscription television system 100. Central control 146 is often associated with the central office of a multi-service operator and may communicate with and control head-end installations in many cities. Central control 146 includes a system control computer 148 that directs the other components of central control 146. One example of a system control computer 148 is a Scientific-Atlanta System Manager 10 network controller. Central control 146 may, for example, provide billing services for the service provider, including billing for pay-per-view events. A billing computer 150 stores billing data and may also format and print bills. Communication between system control computer 148 and HEC 132 may be via modem, although the invention is not limited in this respect. Authorization data may be transmitted from system control computer 148 to HEC 132. HEC then 132 appropriately formats the authorization data and transmits the formatted authorization data to subscriber terminal units either in-band through scrambler 130 or out-of-band through out-of-band data transmitter 134 as discussed above.

Head-end installation 125 also includes an RF processor 152 for receiving reverse path data communications from subscriber locations 120-1, . . . , 120-n. These data communications may include billing information for impulse-pay-per-view purchases which may be forwarded to system control computer 148 and may also include subscriber requests for database information maintained at head-end installation 125. For example, a database server 154 such as an Oracle® database server may provide access to reference materials such as encyclopedias, atlases, dictionaries, and the like. The subscriber request is forwarded from RF processor 152 to an information request processor 156 which accesses database 154 for the requested information and forwards the requested information to the requesting subscriber, for example, via an addressed in-band or out-of-band transaction as described above. In addition, information request processor 156 may also access a communications network 158 in order to provide subscriber access to services such as the Internet.

As the amount of the data transmitted between the head-end installation and the subscriber locations increases, increased use will likely be made of out-of-band and digital transmission. For example, 50 MHz of bandwidth may be dedicated to digital data (non-video) transmission, both forward channel (to the subscriber terminal unit) and reverse channel (from the subscriber terminal unit). 200 MHz or more may also allocated to digital video and 300 MHz to 500 MHz may be allocated for analog video. Accordingly, although various illustrative transmission techniques are discussed above, the present invention is not limited in any respect by the manner in which information is communicated between the head-end installation and the subscriber locations.

Referring to FIG. 2C, each subscriber location 120-1, . . . , 120-n includes a subscriber terminal unit 160 connected to distribution network 138. "Subscriber location" as used herein refers to any location which is remotely located with respect to head-end installation 125. In accordance with the instant invention, a subscriber terminal may, for example, be located in a home, a classroom, a hotel room, a hospital room, or an office. Each subscriber terminal unit 160 may be coupled to one or more devices 162-1, . . . , 162-n. Devices 162-1, . . . , 162-n may include devices which are capable of being operated in response to user-supplied commands and the instant invention is not limited in this respect. Thus, the devices may include televisions, stereo receivers, video cassette recorders (VCRs), audio cassette recorders, compact disc (CD) players, video disc players, video game players, computers, and the like. Certain ones of the devices may be operatively connected together. Thus, as shown in FIG. 2C, device 162-1 is connected to device 162-2. For example, device 162-2 may be a television and device 162-1 may be a video cassette recorder. For purposes of discussion, it will be assumed that device 162-1 is a video cassette recorder and that device 162-2 is a television. One or more of devices 162-1, . . . , 162-n may be connected to switched power outlets of subscriber terminal unit 160, whereby subscriber terminal unit 160 may internally effect the on and off switching of these devices. A remote control unit 166 communicates information to subscriber terminal unit 160 over a communication link 168. Communication link 168 may, for example, be an infrared link.

Figure 3:
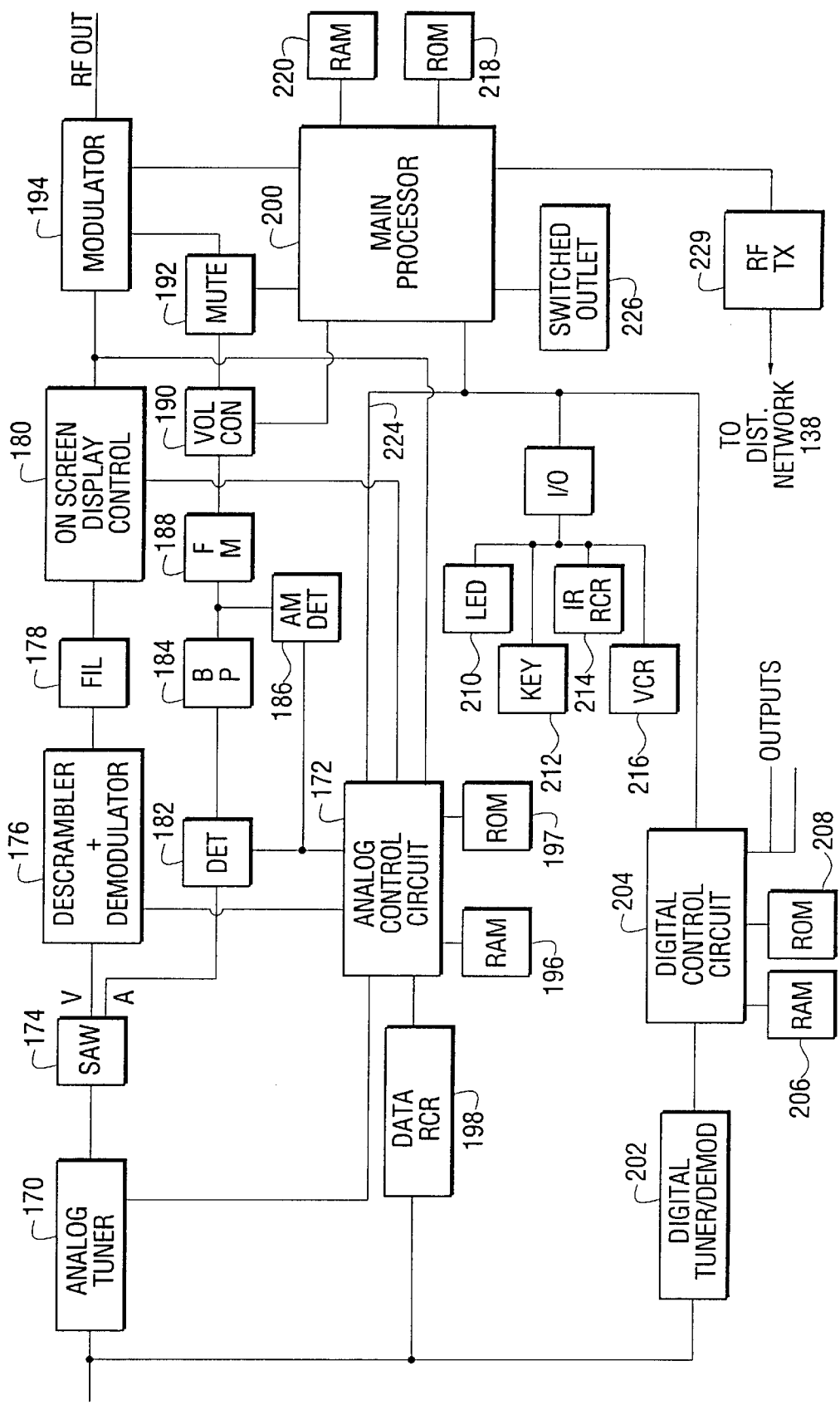
FIG. 3 is a detailed block diagram of subscriber terminal unit 160 shown in FIG. 2C.

FIG. 3 is a detailed block diagram of subscriber terminal unit 160. The wide-band signal from communications network 138 is supplied to an analog tuner 170, a data receiver 198, and a digital tuner 202. Analog tuner 170 and digital tuner 202 are tunable according to a channel selected by a subscriber. Analog tuner 170 is tunable, for example, over a frequency range of 54 MHz to 550 MHz and can be tuned to a predetermined "off-channel" for receiving in-band data when television 160-2 is switched off. This so-called off-channel may be predetermined by system control computer 148 (see FIG. 2B) and data identifying the predetermined channel may be forwarded to subscriber terminal unit 160 using any one of the data transmission techniques described above. The off-channel identification data may be stored in memory of subscriber terminal unit 160. Preferably, only one of the analog and digital tuners is active at a given time.

Analog tuner 170 uses a phase-locked loop under the control of analog control circuit 172 to convert the selected or predetermined off channel signal to a 45.75 MHz intermediate frequency (IF) signal. Analog control circuit 172 may, for example, be an application specific integrated circuit (ASIC) which combines a plurality of subscriber terminal unit control and data handling functions into a single unit. Of course, the ASIC may include any combination of individual control circuits. Alternatively, or in addition, other control circuitry may be used, such as a microprocessor. Analog control circuit 172 has an associated RAM 196 and ROM 197.

A filter 174, for example, a SAW filter, filters the IF signal from analog tuner 170 to split the signal into separate video and audio portions for processing. The video portion is demodulated and descrambled by video demodulator and descrambler 176 under the control of analog control circuit 172. For example, if sync suppression scrambling has been used, video demodulator and descrambler 176 may perform sync restoration. The video signal then passes through a bandpass filter 178 to an on-screen display control 180 where inverse video inversion (descrambling) takes place, if necessary. The descrambling of the video portion, whether sync suppression, sync inversion, video line inversion, and the like, is under the control of analog control circuit 172.

Thus, analog control circuit 172 supplies to on-screen display control 180 any necessary timing signals, inversion axis levels, and information about whether the video is inverted and supplies to video demodulator and descrambler 176 any necessary timing, restoration levels, and identification of sync pulses to be restored. Analog control circuit 172 receives the descrambling data for implementing such control, for example, from pulses as inband audio data or from data modulated on the video during the vertical blanking interval.

In the other path, the audio signal is converted to the intermodulation frequency of 4.5 MHz by a synchronous detector 182. Feedback for automatic gain control of synchronous detector 182 is supplied from the output of a bandpass filter 184. An amplitude modulation detector 186 performs pulse detection to recover in-band audio data which is amplitude modulated onto the audio carrier. The detected in-band audio data is supplied to analog control circuit 172. The in-band audio data, except for descrambling data, is stored in RAM 196 for buffering. The descrambling data is directly accessed by analog control circuit 172 for the above-described descrambling operations. The audio signal from bandpass filter 184 is demodulated by an FM demodulator 188. Volume control of the audio signal is performed under control of a volume control circuit 190 and a main processor 200 as described, for example, in commonly assigned U.S. Pat. No. 5,054,071, which is incorporated herein by reference. After volume control, the audio signal is supplied to a mute switch 192 which is under the control of main processor 200. The output of mute switch 192 is supplied to a modulator 194.

The output of on-screen display control 180 is supplied to analog control circuit 172 for detecting in-band video data from the blanking intervals of the signal. Analog control circuit 172 stores the detected data in RAM 196 prior to processing by main processor 200. As noted above, any descrambling data is directly accessed by analog control circuit 172 for the above-described descrambling operations. Additional details of the detecting of this in-band video data can be found in commonly assigned copending application Ser. No. 08/229,805, filed Apr. 19, 1994, entitled "Subscription Television System and Terminal for Enabling Simultaneous Display of Multiple Services", which is incorporated herein by reference. Further, time-of-day data is transmitted from head-end installation 125 and stored in RAM 196, for example. For example, global time-of-day transmissions may periodically occur, based on satellite time standards as described in commonly assigned U.S. Pat. No. 4,994,908, which is incorporated herein by reference. Thus, main processor 200 has access to current time-of-day information.

On-screen display control 180 selectively generates on-screen character and graphics displays in place of or overlaid on the video signal. For example, information stored in RAM 196 or ROM 197 may be read out to on-screen display control 180 and used to generate onscreen characters and/or graphics. Modulator 194 combines the output of on-screen display control 180 and the audio signal from the output of mute switch 192 and converts the combined signal to the channel frequency selected by main processor 200, such as channel 3 or 4. The combined and remodulated signal is supplied as an RF output to VCR 162-1 and/or to television 162-2 in a well known manner.

The input wide-band signal is also supplied to out-of-band data receiver 198. Out-of-band data receiver 198 provides received out-of-band data to analog control circuit 172. This data may be stored in RAM 196 where it is accessible by main processor 200.

The input wide-band signal is also supplied to a digital tuner/demodulator 202 which is tunable in a range, for example, from 400 MHz to 750 MHz and is tuned in accordance with a subscriber selection. Digital tuner/demodulator 202 is used to tune to digital data channels. A digital control circuit 204 which may include an ASIC recovers and processes the digital data on the tuned digital data channel and supplies corresponding analog and/or digital output signals to one of devices 162-1, . . . , 162-n. Alternatively, the recovered digital data may be accessed by one of devices 162-1, . . . , 162-n. For example, if the digital data includes digital audio data, corresponding analog output signals may be supplied to speakers. If the digital data is video game data, a video game player may access the recovered digital data which is stored in RAM 206, for example, through a video game player port (not shown). If the digital data includes digital television data, corresponding analog output signals may be supplied to VCR 162-1 and/or to television 162-2. If the digital data includes software programs, a personal computer may access the recovered software programs through a serial port. Details of digital control circuits which may be used to recover and process digital data may be found, for example, in commonly assigned U.S. Pat. No. 5,239,540 to Rovira; commonly assigned U.S. application Ser. No. 08/352,162, entitled "Secure Authorization and Control Method and Apparatus for a Game Delivery Service"; and commonly assigned U.S. application Ser. No. 07/970,918, entitled "System and Method for Multiplexing a Plurality of Digital Program Services for Transmission to Remote Locations." Each of these patents or applications is incorporated herein by reference thereto. Digital control circuit 204 also has an associated ROM 208.

Although digital tuner 202, digital control circuit 204, RAM 206, and ROM 208 are shown as being integral with the remaining circuitry, these elements may alternatively be provided as an add-on unit which is connectable to main processor 200 via an expansion slot connected to processor bus 224.

Subscriber terminal unit 160 further includes an LED display 210 for displaying information such as channel numbers, a keypad 212 for inputting subscriber commands, an infrared receiver 214 for receiving commands from remote control 166, and a VCR control 216 for transmitting commands to VCR 162-1 by, for example, IR signals. An RF transmitter is controllable by main processor 200 for transmitting reverse path transmissions over distribution network 138. These transmissions may be generated in response to subscriber-supplied inputs for requesting information from database 154 at head-end installation 125 or for the purpose of transmitting billing information regarding impulse pay-per-view purchases to system control computer 148. A switched power outlet 226 may be provided to selectively power one or more of devices 162-1, . . . , 162-n plugged therein.

Main processor 200 is preferably a PowerPC® microprocessor and controls the overall operation of subscriber terminal unit 160 in accordance with program code stored in memory (e.g., ROM 218 and RAM 220) and with data downloaded from head-end installation 125.

In accordance with the instant invention, head-end installation 125 transmits vocabulary data representative of a vocabulary of spoken sounds or words to subscriber terminal units 160. This vocabulary provides, for example, for spoken control of devices 162-1, . . . , 162-n and for spoken control of access to information transmitted by head-end installation 125. Specifically, the transmitted vocabulary may allow a user to use spoken commands to navigate viewing guides and other electronic programming guide menus as well as change channels, control a VCR if present, adjust volume, and power his or her television on and off. The vocabulary data may be either phoneme data or template data and may be provided by one or more of information providers 114-1, . . . , 114-n or may be generated at head-end installation 125 by, for example, ISP 142 as will be discussed below. Main processor 200 of subscriber terminal unit 160 executes a speech recognition algorithm using the vocabulary data transmitted from head-end installation 125 to recognize utterances spoken by a user. One particularly suitable speech recognition algorithm is VProFlex available from VPC. Other suitable speech recognition algorithms are available from IBM, Lernout & Hauspie, Verbex, and Dragon. Recognized utterances may include commands used to control devices 162-1, . . . , 162-n and/or to access information distributed by head-end installation 125.

Figure 4:
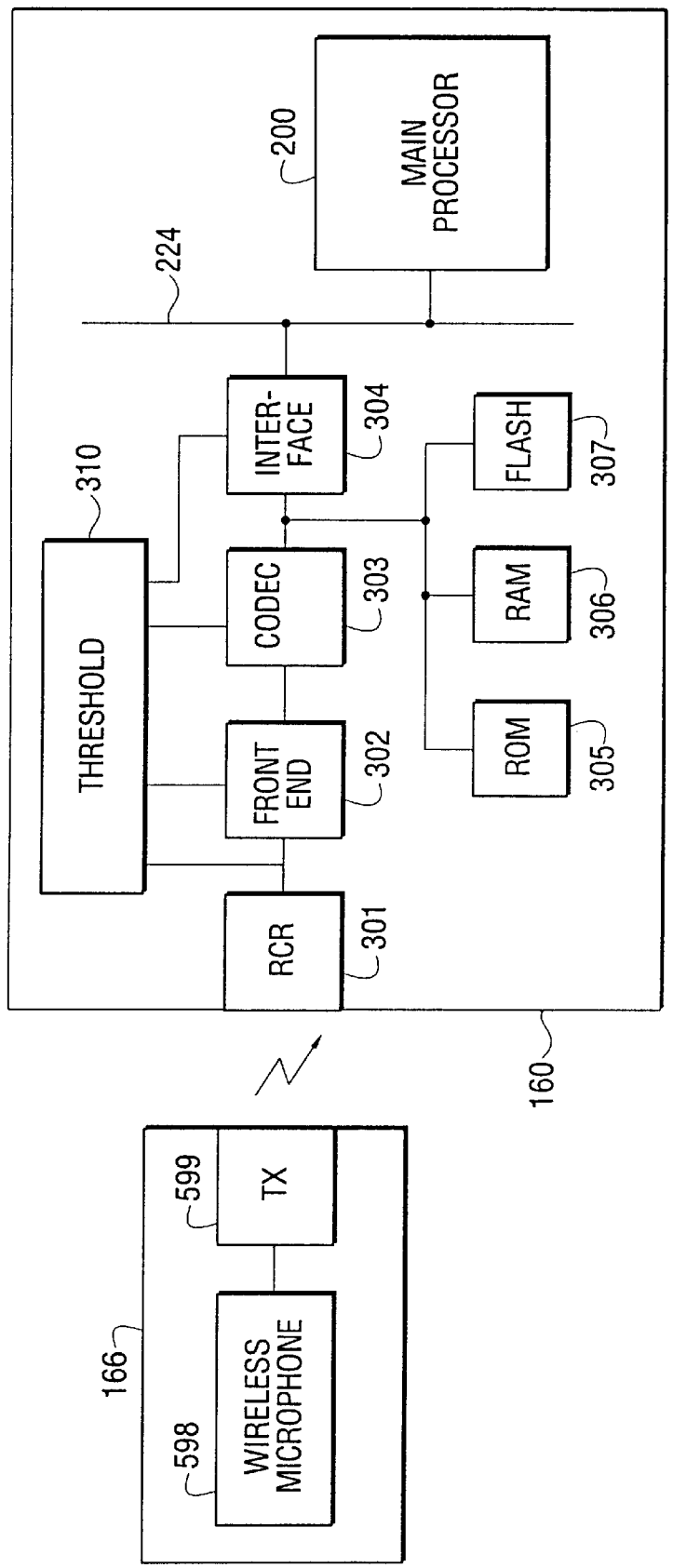
FIG. 4 is a block diagram of a first hardware arrangement of the speech recognition interface of the instant invention.

Various hardware arrangements may be utilized to implement the speech recognition interface. In a first illustrative arrangement shown in FIG. 4, remote control 166 includes a conventional wireless microphone 598 and a transmitter 599 for transmitting the spoken sounds or words to subscriber terminal unit 160 using RF transmission. Subscriber terminal unit 160 includes an RF receiver 301, an analog front end 302 for conditioning the received signal, a codec 303 for performing an analog-to-digital conversion of the conditioned signal, and an interface circuit 304 for interfacing to main processor bus 224. Subscriber terminal unit 160 also includes a ROM 305 for storing the speech recognition software and phoneme definitions, a RAM 306 for storing vocabulary and for serving as a scratch pad, and an optional flash memory 307 for storing vocabulary if it is desired to maintain the vocabulary after power is removed. Flash memory 307 may also store program code to provide the capability of changing programs. It is noted that ROM 305, RAM 306, and flash memory 307 are being used by main processor 200 to perform the speech recognition operation and that if adequate memory is available within the baseline memory of subscriber terminal unit 160, ROM 305, RAM 306, and flash memory 307 need not be provided.

Main processor 200 performs the speech recognition operation of the sounds or words spoken by the user by accessing the speech recognition software stored in ROM 305 and the vocabulary stored in RAM 306 and/or flash memory 307 via interface circuit 304. Specifically, RAM 306 and/or flash memory 307 stores phonemic or template vocabulary data downloaded from head-end installation 125. For example, when the sounds or words are a spoken command for controlling VCR 162-1 or television 162-2, main processor 200 uses the phonemic definitions and speech recognition software of ROM 305 to compare the sounds or words spoken by the user with the phonemic or template vocabulary data stored in RAM 306 and/or flash memory 307 to recognize the spoken command. Main processor 200 then either executes the recognized command internally (such as powering the television on and off or a tuning the television to a selected channel) or forwards the command to the appropriate device for execution. As a power-saving feature, a threshold element 310 may be provided to sense when the sound level exceeds a certain level and enable interface 304 and other components only when sound which is potentially recognizable speech exists.

Figure 5:
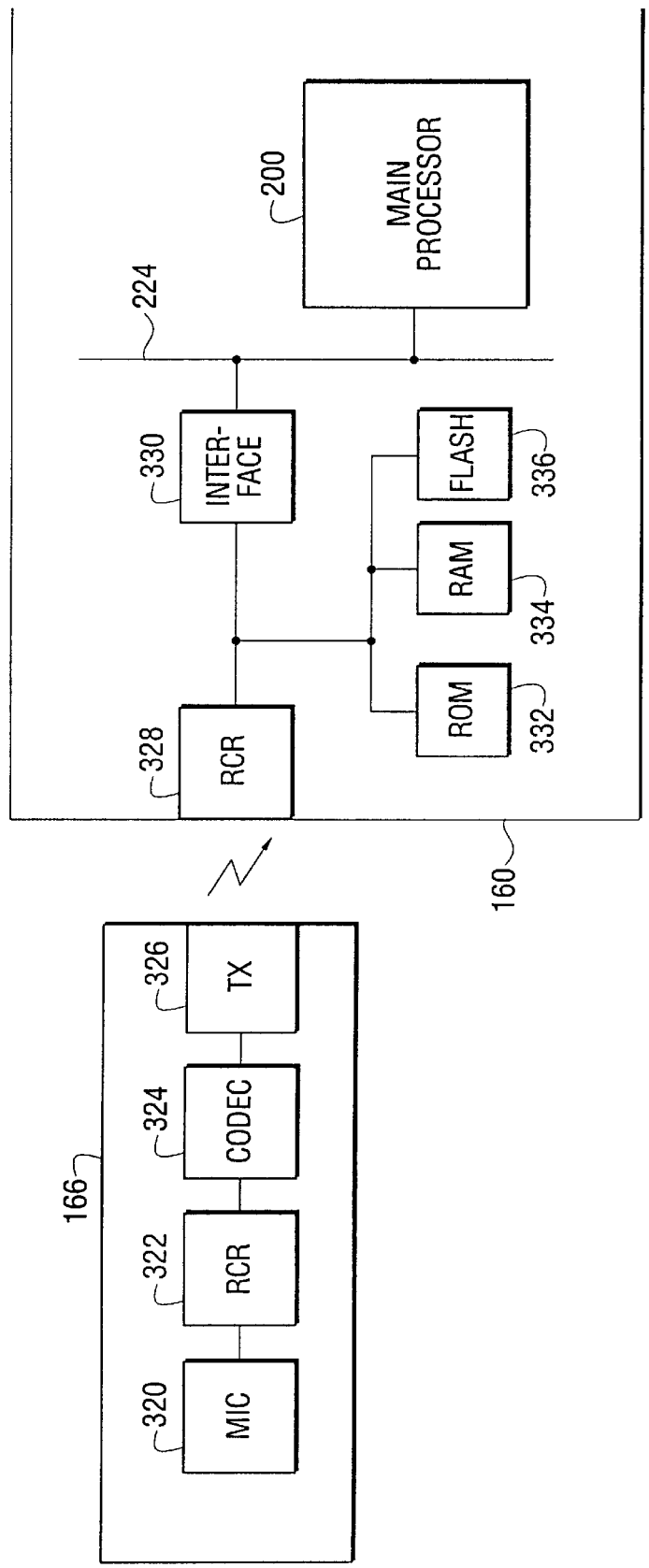
FIG. 5 is a block diagram of a second hardware arrangement of the speech recognition interface of the instant invention.

A second illustrative arrangement of the speech recognition interface is shown in FIG. 5. In this second arrangement, remote control 166 includes a microphone 320, an analog receiver 322 for conditioning the sound signal from microphone 320, a codec 324 for performing an analog-to-digital conversion of the conditioned signal, and a transmitter 326 for transmitting the digitized sound data signal to subscriber terminal unit 160 using, for example, infrared or radio frequency signals. The digitized data requires a data transfer rate of at least 64 k bits per second. Subscriber terminal unit 160 includes a receiver 328 for receiving the digitized sound data signal and an interface circuit 330 for interfacing to main processor bus 224. It is noted that if the digitized sound data signal is transmitted using infrared signals, infrared receiver 214 of subscriber terminal unit 160 may be used to receive the digitized sound data signal. Subscriber terminal unit 160 also includes a ROM 332 for storing the speech recognition software and phoneme definitions, a RAM 334 for storing vocabulary and for serving as a scratch pad, and an optional flash memory 336 for storing vocabulary if it is desired to maintain the vocabulary after power is removed. Flash memory 336 may also store program code to provide the capability of changing programs. Main processor 200 uses the phonemic definitions and speech recognition software of ROM 332 to compare the received digitized sound data signal with the phonemic or template vocabulary data stored in RAM 334 and/or flash memory 336 to recognize the spoken utterances. As a power-saving feature, a threshold element (not shown) may be provided to sense when the sound level exceeds a certain level and to enable interface circuit 330 and other components only when sound which is potentially recognizable speech exists. A similar threshold element (not shown) may also be provided in remote control 166, if desired.

Figure 6:
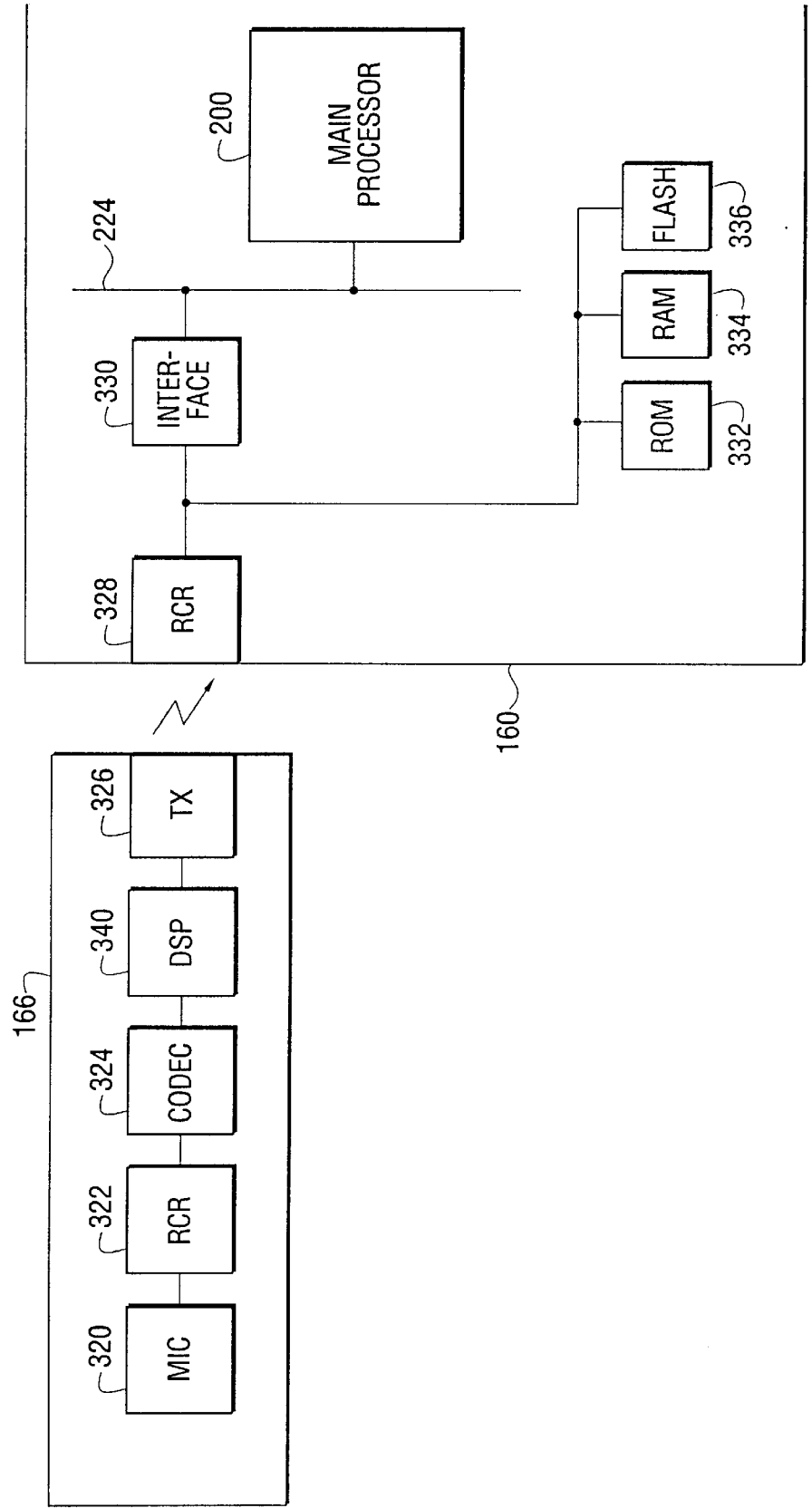
FIG. 6 is a block diagram of a third hardware arrangement of the speech recognition interface of the instant invention.

A third illustrative arrangement of the speech recognition interface is shown in FIG. 6. The arrangement of FIG. 6 is the same that of FIG. 5 except that remote control 166 further includes a digital signal processor 340. Digital signal processor 340 analyzes the digitized sound signal from codec 324 to extract spectral data. Transmitter 326 transmits the extracted spectral data to subscriber terminal unit 160. Because spectral data is transferred rather than digitized sound data, the data transfer rate is much lower than that of the arrangement of FIG. 5, i.e., less than 10 k bits per second. This data transfer rate is better suited for infrared transmission between remote control 166 and subscriber terminal unit 160. As noted with respect to FIG. 5, infrared receiver 214 of subscriber terminal unit 160 may be used to receive the transmitted spectral data if infrared transmission is used. Because the spectral analysis of the sound is performed in remote control 166, the loading of main processor 200 during the speech recognition operation is 30 to 50% less than in the FIG. 5 arrangement.

It is noted that the remote controls of the first, second, and third arrangements include appropriate circuitry such as a keypad (not shown) for inputting and supplying conventional tuning, volume, etc. commands to subscriber terminal unit 160. The conventional circuitry may use transmitters 326 and 599 to transmit these conventional commands or separate transmitters may be used.

Figure 7:
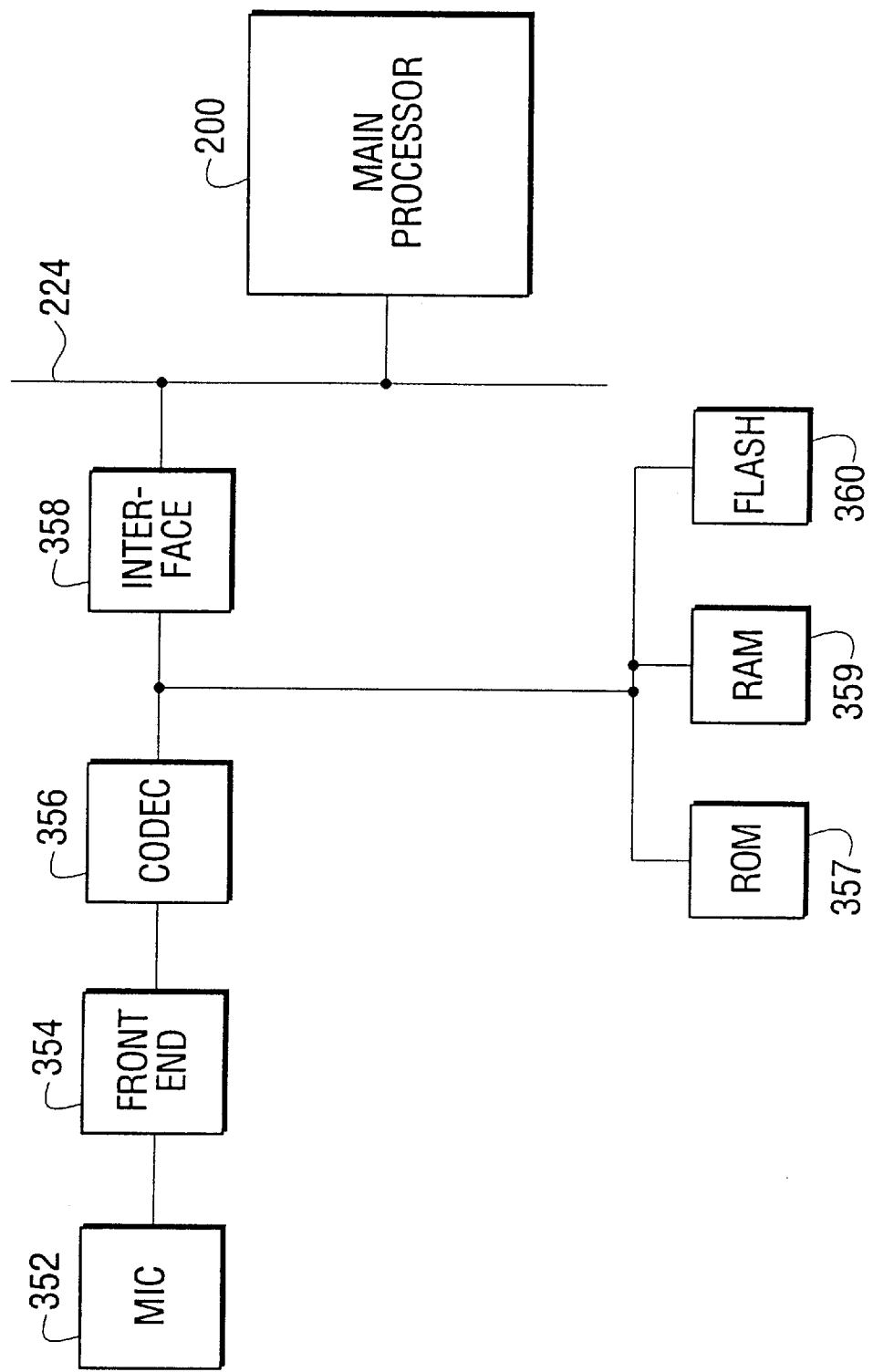
FIG. 7 is a block diagram of a fourth hardware arrangement of the speech recognition interface of the instant invention.

A fourth illustrative arrangement of the speech recognition interface is shown in FIG. 7. In this arrangement, remote control 166 does not perform any speech-related functions. Thus, subscriber terminal unit 160 is directly connected to a microphone 352 which may have a cone surround or use an array of multiple microphones to improve signal to noise ratio. Subscriber terminal unit 160 also includes an analog front end 354 to condition the sound from microphone 352, a codec 356 for performing an analog-to-digital conversion of the conditioned signal, and an interface circuit 358 for interfacing to main processor bus 224. A ROM 357 stores the speech recognition software and phoneme definitions, a RAM 359 stores vocabulary and serves as a scratch pad, and an optional flash memory 360 stores vocabulary if it is desired to maintain the vocabulary after power is removed. Flash memory 360 may also store program code to provide the capability of changing programs.

Figure 8:
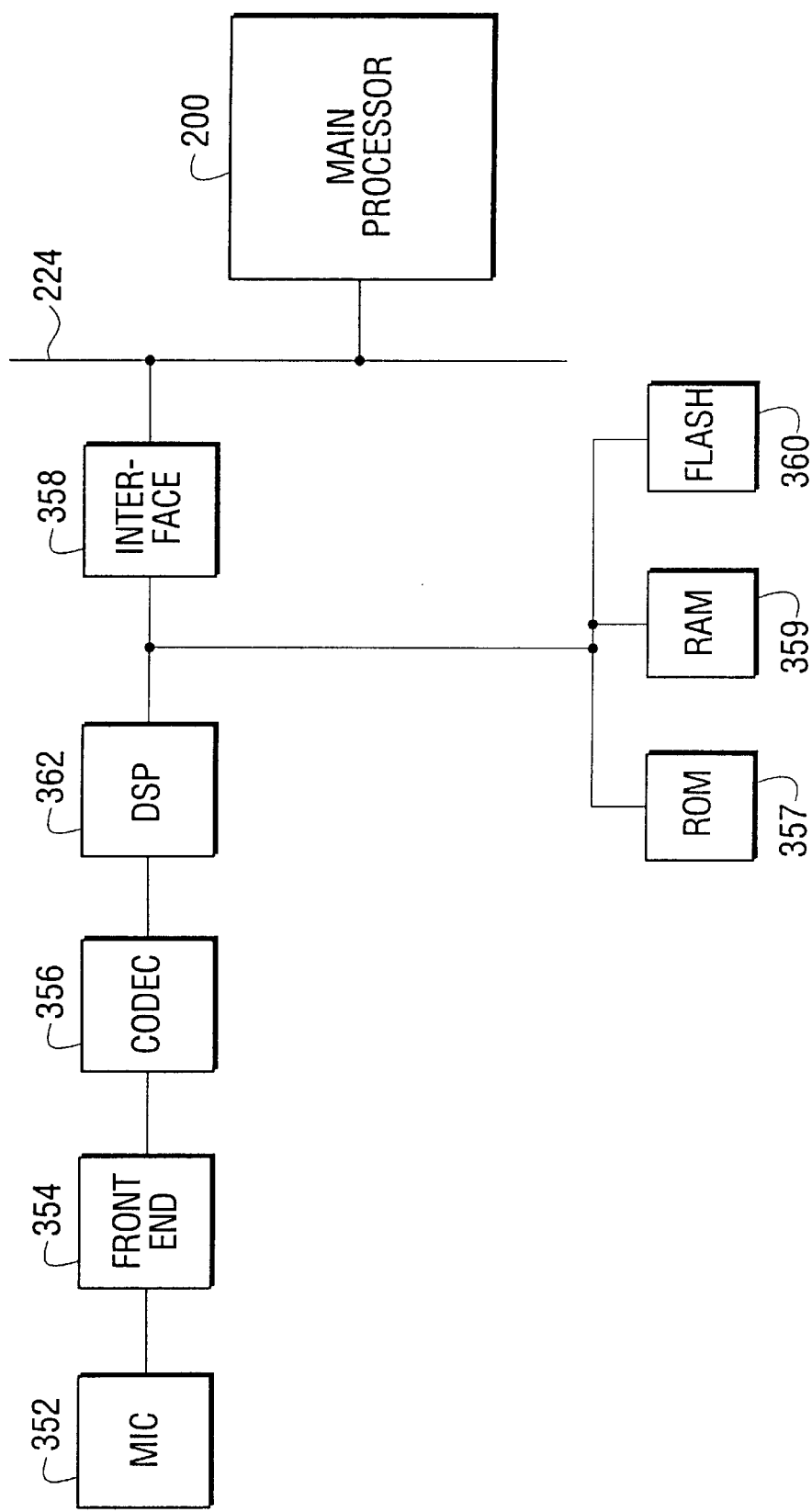
FIG. 8 is a block diagram of a fifth hardware arrangement of the speech recognition interface of the instant invention.

A fifth illustrative arrangement of the speech recognition hardware is shown in FIG. 8. This fifth arrangement is the same as the arrangement shown in FIG. 7, except that a digital signal processor 362 is provided to extract spectral data from the digitized output of codec 356. The inclusion of digital signal processor 362 serves to reduce loading on processor 200 during the speech recognition operation as compared with the arrangement of FIG. 7.

Several optional features may be applied to each of the above-identified arrangements. First, on those remote controls which perform speech-related functions, a press to speak (or <Recognize>) button may be used to exclude spurious noise and/or to extend battery life. Thus, the speech-related circuitry may be powered only when the press to speak button is pressed. Second, in those arrangements where the speech-related functions are provided in subscriber terminal unit 160, a "wake-up" speech command may be used and other command recognition inhibited until the wake-up is recognized. For example, the system might wait for the word "ATTENTION", and then recognize additional utterances for 30 seconds. In addition, various mechanisms may be employed to reduce extraneous sounds. For example, a second microphone may be included on the speech input device which samples the ambient noise and subtracts it from the spoken signal. Alternatively, any television audio which is received at the microphone may be removed by subtracting from the microphone input data the known television audio signal which is being generated by the subscriber terminal unit. This would assist in preventing recognition of "commands" or "utterances" spoken by television voices.

Figure 9:
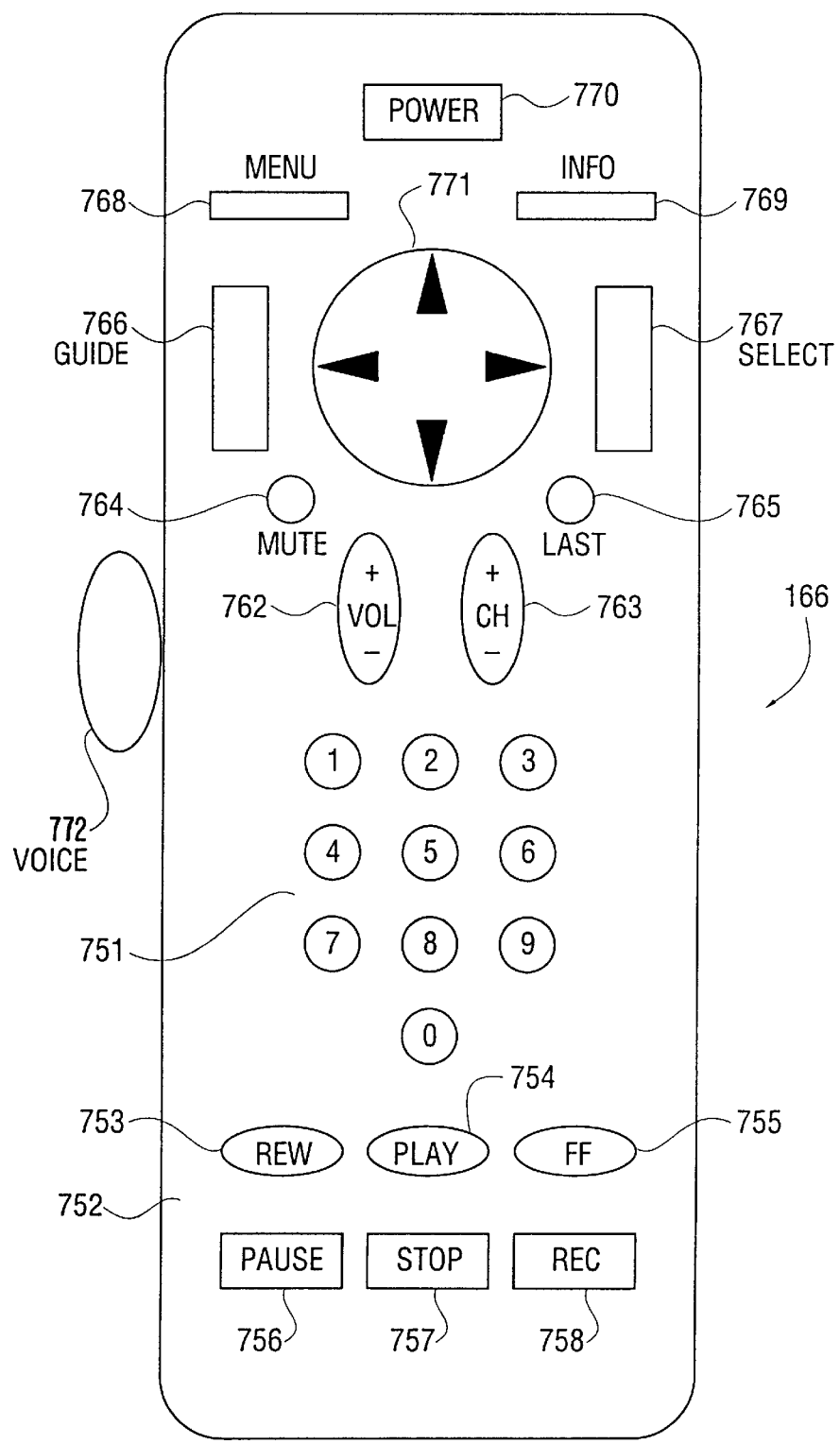
FIG. 9 is an illustration of remote control 166 shown in FIG. 2C.

FIG. 9 is an illustration of a remote control 166. Remote control 166 includes a numeric keypad 751 including number buttons <0>, <1>, . . . <9>; VCR control buttons 752 including <Rewind> button 753, <Play> button 754, <Fast Forward> button 755, <Pause > button 756, <Stop > button 757, and <Record > button 758; <Volume > control button 762; <Channel> control button 763; <Mute> button 764; <Last> channel button 765; <Electronic Program Guide > button 766; <Select > button 767; <Menu > button 768; <Information> button 769; <Power> button 770; cursor control 771; and <Recognize> button 772. <Recognize> button 772 is provided so that the user may activate the speech recognition interface of the instant invention by supplying power to the speech-related components of remote control 166. In this regard, it is noted that the arrangements of FIGS. 7 and 8 do not include any speech-related components in remote control 166. Accordingly, remote controls used in these respective arrangements would not include a <Recognize> button. In the arrangements of FIGS. 7 and 8, an "ATTENTION" command would be spoken by the user in order to activate the speech recognition interface in subscriber terminal unit 160. The remainder of the keys and buttons on remote control 166 operate in a conventional manner and will not be discussed in detail herein.

Head-end installation 125 may be configured to transmit different vocabulary data to different subscriber terminal units. For example, vocabulary data may be provided to subscriber terminal units in accordance with a monthly service fee. Thus, for a first service fee, first vocabulary data for defining commands to implement basic spoken controls of a device such a television may be provided to a subscriber terminal unit. For a second higher service fee, second, more sophisticated vocabulary data for implementing extended spoken controls of the television, as well as control of a VCR, stereo, game player, etc. may be provided to a subscriber terminal unit. The second vocabulary data may also define words and commands which may be used to access information transmitted by head-end installation 125. Higher services fees may also be charged for the actual accessing of the information which is controlled by the more sophisticated speech interface.

When a display is provided which includes text which may be spoken as a command or a recognized word, such commands or recognized words are preferably highlighted in some manner, such as by coloring them green in a manner similar to that in which keywords are highlighted in the Microsofts® Windows® Help features, in order to cue the user.

Exemplary downloaded vocabularies will be discussed below. For the purposes of these discussions, it will be assumed that the vocabulary data is phonemic data. It is noted that use of phonemic data and the specific commands in each of the vocabularies are for illustrative purposes only and the invention is not limited in these respects.

A first vocabulary for permitting spoken control of a television will now be described. The first command vocabulary may be provided to permit a user to perform basic television controls such as (1) ON/OFF power control using "POWER ON" and "POWER OFF" commands; (2) volume control using "VOLUME NUMBER", "VOLUME UP", and "VOLUME DOWN" commands; and (3) channel selection control using "GOTO CHANNEL NUMBER", "SURF UP", "SURF DOWN", "LAST" channel commands. The phonemic vocabulary data representing the first vocabulary may be transmitted, for example, by an addressed transmission in accordance with any of the above-described data transmission techniques to subscribers who have paid a first predetermined service fee. The phonemic vocabulary data representing the first vocabulary may be generated by ISP 142 using a commercially available text-to-speech/phoneme translation program or may be provided to ISP 142 from one of the information providers. The phonemic data may likewise be generated by the information providers using a text-to-speech/phoneme translation program. The basic television controls mentioned above may be implemented by an illustrative, but non-limiting, first vocabulary set forth in Table I.

TABLE I

| Power  | One      | Two     | Three    | Four    |
|--------|----------|---------|----------|---------|
| Five   | Six      | Seven   | Eight    | Nine    |
| Ten    | Eleven   | Twelve  | Thirteen | Zero    |
| O      | Fifteen  | Teen    | Thirty   | Forty   |
| Fifty  | Sixty    | Seventy | Eighty   | Ninety  |
| Twenty | Hundred  | Up      | Down     | Channel |
| Off    | Surf     | Power   | Stop     | On      |
| Last   | Attention| Goto    |          |         |

A command grammar which specifies how the words of the first vocabulary may be used may also be transmitted. Thus, for example, the commands "POWER ON" and "POWER OFF" are allowable commands, but "ON POWER" and "OFF POWER" may be excluded. The command grammar may also include context specific rules. For example, the "POWER ON" command may be allowed only when the television is OFF. As noted above, some or all of the command grammar and context-specific rules may be permanently resident in the memory of the subscriber terminal unit.

The control of television 162-2 using the command vocabulary of Table I will now be explained. In general terms, when a <Recognize> button 772 is present on remote control 166, the recognition operation of the instant invention is activated by pressing the <Recognize> button 772. When no <Recognize> button is present on remote control 166, the recognition operation is activated by speaking an activation command such as "ATTENTION". When activated, subscriber terminal unit 160 preferably provides a suitable indication to this effect to the user. For example, main processor 200 and on-screen display control 180 may superimpose a display of the word "Listening . . . " in the lower center of the screen of television 162-2 to provide the indication. It is noted that the indication of the activation of the speech recognition interface is not limited to an on-screen display and may, for example, be an aural indication in addition to or in place of the on-screen display. After the indication, the user may speak sounds or words for controlling television 162-2 in accordance with the command vocabulary. It is noted that the indication is provided to enhance the speech recognition user interface, but such an indication is not a required feature of this invention.

Main processor 200 uses the phonemic definitions and speech recognition software stored in memory as discussed above to compare the spoken sounds or words with the phonemic data of the vocabulary. If the comparison results in a recognition of a command, television 162-2 is appropriately controlled. If the comparison does not result in a recognition of the command, one or more of several actions occurs. An indication may simply be provided to the user that the command was not recognized and the user may be prompted to repeat the command or to use the keypad to implement the command (if possible). If a command is repeated nonsensically, for example, "GOTO CHANNEL SIXTEEN" is repeated twice in a subscription television system in which channel sixteen is not a valid channel, subscriber terminal unit 160 may assume that a misrecognition occurred the first time and that the user actually wants to tune to a similar-sounding channel, probably channel 60. If the top two recognition options have comparable likelihoods, the user is informed what the two options are and is asked to select one over the other. If a user has frequently spoken a specific command, for example, "GOTO CHANNEL SIXTEEN" (ESPN perhaps) but has, in this case, apparently selected a less frequently accessed command, such as "GOTO CHANNEL SIXTY" (PBS perhaps), the more commonly spoken command may be implemented. In addition, if the recognition algorithm includes a speaker identification algorithm which can recognize a specific speaker's voice, this adaptive learning of recognition preferences may be tailored to each speaker. In addition, based upon context, only specific commands may be valid. For example, if the television is turned off, the only feasible command is "POWER ON", and a spoken command that resembles that phrase should be interpreted accordingly.

The steps for turning television 162-2 ON using the speech recognition interface will now be described. First, the user activates the speech recognition interface by pressing a <Recognize> button on a remote control or by saying "ATTENTION", as appropriate. The user then says "POWER ON". If the "POWER ON" command is recognized, television 162-2 is switched ON and tuned to the last viewed channel. Preferably, the corresponding channel number is displayed. Other information such as current time, channel identifiers such as CBS, ABC, NBC, and the like, may also be displayed.

The steps for turning television 162-2 OFF using the speech recognition interface will now be described. After activating the speech recognition interface, the user says "POWER OFF". If the "POWER OFF" command is recognized, television 162-2 is turned OFF.

Figures 10, 11:
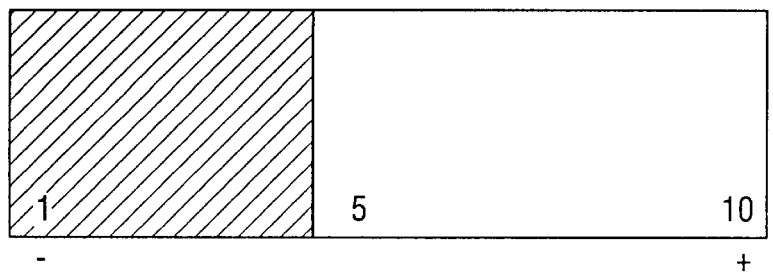
FIG. 10 is a diagram of a volume line bar.
FIG. 11 is a diagram of an electronic programming guide grid.

One technique for controlling the sound level using the speech recognition interface will now be described. After activating the speech recognition interface, the user says "VOLUME NUMBER", where NUMBER is a number which specifies volume on a fixed scale, such as a linear scale from 1 to 10. If the "VOLUME NUMBER" command is recognized, a line bar such as shown in FIG. 10 with the current volume level shaded in is displayed on the television screen. The volume level is then set to the volume level corresponding to the number NUMBER and the volume line bar is updated. The updated line bar preferably remains on the television screen for some predetermined period of time such as two seconds.

The user may also say "VOLUME UP" after activating the speech recognition interface. If the "VOLUME UP" command is recognized, the television screen displays a line bar such as shown in FIG. 10 with the current volume level shaded in. The sound level is then increased by one unit every two seconds until the user says "STOP". Preferably, the television screen displays a prompt such as "SAY STOP WHEN DESIRED VOLUME HAS BEEN REACHED." When the user says "STOP", the volume level is tuned to the current increased level and the volume line bar is updated. The volume line bar remains on the screen for some predetermined period of time such as two seconds. It should be noted that if the user has a remote control with a <Recognize> button, this button must be actuated when the user speaks the "STOP" command. If the spoken activation command is used, the speech recognition interface will be active for some predetermined time period after the activation command or the most recent command (i.e., "VOLUME UP") is spoken.

The user may also say "VOLUME DOWN" after activating the speech recognition interface. If the "VOLUME DOWN" command is recognized, the television screen displays a line bar such as shown in FIG. 10 with the current volume level shaded in. The sound level is then decreased by one unit every two seconds until the user says "STOP". Preferably, the television screen displays a prompt which prompts the user to say "STOP" when the desired volume has been reached. When the user says "STOP", the volume level is tuned to the current decreased level and the volume line bar is updated. The volume line bar remains on the screen for some predetermined period of time such as two seconds. Again, it should be noted that if the user has a remote control with a <Recognize> button, this button must be actuated when the user speaks the "STOP" command. If the spoken activation command is used, the speech interface will be active for some predetermined time period after the activation command or the most recent command (i.e., "VOLUME DOWN") is spoken.

A direct channel tuning operation using the speech recognition interface will now be explained. After activating the speech recognition interface, the user says "GOTO CHANNEL NUMBER", where NUMBER is a channel number. If the "GOTO CHANNEL NUMBER" command is recognized, the television screen displays the channel number NUMBER and the television is tuned to the channel corresponding to the spoken channel number NUMBER. If the user has purchased an electronic programming guide option, the title and a short summary of the current programming on the tuned channel are also preferably displayed.

A first channel scanning ("surfing") operation using the speech recognition interface will now be explained. It will be assumed that the television is currently tuned to channel 2. After activating the speech recognition interface, the user says "SURF UP". Alternatively, of course, other descriptive vocabulary may be used in place of "SURF" such as "SCAN". If the "SURF UP" command is recognized, the television screen may display a prompt such as "RECOGNIZE SURF UP. SAY "STOP" WHEN DESIRED CHANNEL IS REACHED." Television 162-2 is then tuned to channel 3 and the television screen displays "3." Television 162-2 remains tuned to channel 3 for two seconds and is then tuned to channel 4, 5, etc. Each available channel is tuned to for two seconds and a display of the corresponding channel number is provided. If the user says "STOP" when, for example, channel 50 is the current channel, television 162-2 remains tuned to the current channel and the channel number display is provided for a predetermined period of time such as two seconds. It should be noted that if the user has a remote control with a <Recognize> button, this button must be actuated when the user speaks the "STOP" command. If the spoken activation command is used, the speech recognition interface will be active for some predetermined time period after the activation command or the most recent command (i.e., "SURF UP") is spoken.

A second channel scanning ("surfing") operation using the speech recognition interface will now be explained. It will be assumed that the television is currently tuned to channel 50. After activating the speech recognition interface, the user says "SURF DOWN". If the "SURF DOWN" command is recognized, the television screen may display a prompt such as "RECOGNIZE SURF DOWN. SAY STOP WHEN DESIRED CHANNEL IS REACHED." Television 162-2 is then tuned to channel 49 and the television screen displays "49". Television 162-2 remains tuned to channel 49 for two seconds and is then tuned to channel 48, 47, etc. Each available channel is tuned to for two seconds and a display of the corresponding channel number is provided. If the user says "STOP" when, for example, channel 2 is the current channel, television 162-2 remains tuned to the current channel and the channel number display is provided for a predetermined period of time such as two seconds. It should be noted that if the user has a remote control with a <Recognize> button, this button must be actuated when the user speaks the "STOP" command. If the spoken activation command is used, the speech recognition interface will be active for some predetermined time period after the activation command or the most recent command (i.e., "SURF DOWN") is spoken.

A last or previous channel operation will now be explained. For purposes of this discussion, it is assumed that the television is currently tuned to channel 4. The user activates the speech recognition interface and says "GOTO CHANNEL TEN". If the direct channel tuning command is recognized, television 162-2 is tuned to channel 10 as discussed above with respect to the direct channel tuning operation. The user may then activate the speech recognition interface and say "LAST". If the "LAST" command is recognized, television 162-2 is tuned to the previously tuned channel, i.e., channel 4, and the corresponding channel number is displayed for a predetermined period of time. If the user activates the speech recognition interface and says "LAST" again, television 162-2 is tuned to channel 10 and the corresponding channel number is displayed for a predetermined period of time.

If any of the above spoken commands is not recognized, any of the actions described above with respect to unrecognized commands may be implemented.

It is noted that each of the above-discussed commands is executed internally to subscriber terminal unit 160. That is, the powering on and off of television 162-2 is accomplished by appropriately controlling switched power outlet 226 into which television 162-2 is plugged. The television tuning and volume control operations are accomplished by appropriately controlling tuners 170 and 204 and volume control circuit 190 and mute switch 192 of the subscriber terminal unit. However, the invention is not limited in this respect and recognized commands may be forwarded to one of devices 162 via infrared signals, for example, for execution.

Second vocabulary data for implementing control of VCR 162-1 and television 162-2 and for accessing electronic program guide (EPG) data will now be described. Accordingly, for purposes of the discussion below, it will be assumed that data signal 122-3 from information provider 114-3 provides EPG data via satellite 123 to head-end installation 125 and that this data is transmitted as in-band data in the manner set forth above. Of course, the invention is not limited in this respect. The EPG data from information provider 114-3 includes television schedule information arranged by time and channel. One such information provider for providing EPG data is Insight Telecast Inc. System operators can purchase this data and provide it to their subscribers.

The EPG information received at head-end installation 125 will often be very extensive, containing data for programs up to one or two weeks in advance. If all of this data is to be transmitted to subscriber terminal units 160, the subscriber terminal units must be able to store the EPG information in memory. To store EPG data for one or two weeks of programming requires a significant amount of memory. Providing extra memory in subscriber terminal units 160 is expensive because of the hundreds or thousands of such terminal units that are present in a typical information system. Frequently, subscribers may prefer a less expensive unit that provides only a portion of the EPG data supplied by the EPG information provider, such as the EPG data for next few hours. The subscribers can then benefit from lower cable service bills or purchase expenses if subscribers are to own the terminals. Thus, head-end installation 125 is preferably provided with the capability of selecting only certain portions of the EPG data to be transmitted to the subscriber terminal units. For example, ISP 142 may be provided with this capability. In addition, the downloaded vocabulary will be affected by the scope of the downloaded EPG information. For example, if the subscriber has selected a priced option which provides for title-addressable program selection (e.g., "FIND STAR TREK"), then the vocabulary data for the programming period selected (1 to 14 days) will be downloaded with the EPG data. In general, when the user selects a priced option such as messaging, an expanded channel line-up, wide area network access, or an expanded EPG, the corresponding grammar and vocabulary are also downloaded to subscriber terminal unit 160 from head-end installation 125. If the EPG data is received by ISP 142, ISP 142 selects the portion to be transmitted to subscribers and passes only that portion to scrambler 130. By selecting only a portion of the data provided by the EPG information provider, less data is transmitted than would otherwise be the case. Thus, the data repetition rate is increased. ISP 142 may not only select portions of the EPG data, but may also add data on local stations not covered by information provider 114-3. ISP 142 may also reformat the data in such a way as to make it more pleasing to the subscribers.

If the EPG data is transmitted in the vertical blanking interval of at least one of the television signals, the EPG data is constantly transmitted in the vertical blanking interval by scrambler 130. Scrambler 130 has memory dedicated to storing the EPG data. The amount of memory depends on the amount of EPG data to be transmitted to the subscribers. If ISP 142 selects only a small portion of the EPG data provided by EPG information provider 114-3, e.g., the EPG data for a few hours, then a small memory, perhaps 128 k bytes, may be sufficient. For larger segments, 512 k bytes of memory may be necessary. For a couple of weeks of EPG data, 1M bytes of memory may be required. ISP 142 periodically updates the scrambler memory with new EPG data received from EPG information provider 114-3. ISP 142 tags the data as either long term or short term, depending on whether the data concerns a shortly upcoming program or a more distant one. The scrambler sends out the short term data more frequently than the long term data. This is because the EPG data is stored in memory at subscriber terminal unit 160, and must be updated frequently. But the subscriber terminal unit is not constantly tuned to the channel where the EPG data is located. Subscriber terminal unit 160 tunes to the EPG data channel (which may, for example, be the off-channel discussed above) whenever possible to obtain update information. By sending out short term data very frequently, it is likely that a given subscriber terminal unit will have accurate short term data stored therein, which is the most important data to a user of the subscriber terminal unit. Long term data is sent out less frequently. Programming changes may also be grouped with the short term data. It will be appreciated that the EPG may be transmitted by other means and the invention is not limited in this respect.

In order to provide spoken control of VCR 162-1 and television 162-2, as well as spoken access to EPG data transmitted from head-end installation 125, second vocabulary data may be downloaded from head-end installation 125. This second vocabulary data may be transmitted, for example, by an addressable transmission to subscribers who pay a second service fee which is higher than the service fee for the first vocabulary. The second vocabulary permits the basic television controls described above, as well as control of VCR 162-2 and access to EPG data. More particularly, this second vocabulary permits a user to use spoken commands to implement basic television control, EPG control, VCR control, and event programming.

An electronic programming guide will be described generally so that a better understanding of the instant invention may be obtained. With reference to FIG. 11, horizontally indicated at block 60 are date and time slots. Channel selections appear vertically on the left side of the screen. Of course, the arrangement of the channels and times could be reversed in an alternative embodiment. For example, at block 62 is found HBO, which is channel 15 in FIG. 11. The name of a television program is associated with each time slot and channel slot. For example, associated with the 7:30 p.m. time slot and channel 14 is "Gilligans Island", shown at block 64. The channels on the left-hand side of the EPG are arranged in numerical order from top to bottom. The EPG provides program descriptions which include the title, and may include other information such as ratings or an indication that the program is closed-captioned. For example, block 66 provides all of this information.

An illustrative, but non-limiting, vocabulary suitable for implementing this control includes the vocabulary of Table I above and the additional vocabulary of Table II below. Many of these words are prompted on the television screen as part of the EPG windowing. As noted above, on-screen text which may be spoken as a command or recognized word is preferably highlighted in some manner, such as by coloring it green in a manner similar to the Microsoft® Windows® Help features, in order to cue the user. The vocabulary below is a representative vocabulary and the user is prompted that a command or word of an on-screen display is a legal spoken command or word by highlighting the text in some suitable manner.

TABLE II

| | | | | |
|---|---|---|---|---|
| Monday | Tuesday | Wednesday | Thursday | Friday |
| Saturday | Sunday | AM | PM | VCR |
| Play | Record | Rewind | FastForward | Eject |
| TV | Stereo | Clock | Left | Right |
| Up | Down | One-Time | Daily | Weekly |
| PreviousDay | NextDay | Select | Main-Menu | Guide |
| EPG | Set | Change | Clear | Exit |
| More | Movies | Comedy | Messages | Program |
| Goto | Page | | | |
| Electronic-Programming-Guide | | Pay-per-view | | |
| What's-on-cable | | Favorite | | |
| Program-Timer | | Parental-control | | |
| Pending-Recordings | | Cable-Terminal-Setup | | |
| Channel-Listing | | Categories | | |
| Children-Education-Science | | Drama-Romance | | |
| Entertainment-Variety | | Sleep-timer | | |
| News-Talk-Magazine | | Specials-Mini-Series | | |
| Pre-Recorded Sports | | Live-Sports | | |
| Action-Mystery-Horror | | Viewing-Guide | | |
| Miscellaneous | | Plus-Codes | | |
| Provide-Information-On | | Recordings | | |

The general operation of the speech recognition interface using the second vocabulary is basically the same as with respect to the first vocabulary. That is, when a <Recognize> button is present on remote control 166, the speech recognition operation of the instant invention is activated by pressing the <Recognize>button. When no <Recognize> button is present on remote control 166, the speech recognition operation is activated by speaking an activation command such as "ATTENTION". When activated, subscriber terminal unit 160 preferably provides a suitable indication to this effect to the user. For example, main processor 200 and on-screen display control 180 may superimpose a display of the word "Listening . . . " in the lower center of the screen of television 162-2 to provide the indication. After the indication, the user may speak sounds or words for controlling the EPG, VCR 162-1 and television 162-2 in accordance with the second vocabulary. Main processor 200 uses the phonemic definitions and speech recognition software to compare the spoken sounds or words with the phonemic data of the second vocabulary. If the comparison results in a recognition of the command, VCR 162-1 or television 162-2 are appropriately controlled. If the comparison does not result in a recognition of the command, the actions described above for unrecognized commands may be implemented.

The basic television controls using the second vocabulary are the same as those described above and reference should be made thereto.

In accordance with the vocabulary set forth in Tables I and II and with reference to FIG. 12, the use of the speech recognition interface to use the electronic program guide to determine "What's On Cable" will be described. After the speech recognition interface is activated, the user says "MAIN MENU." If the "MAIN MENU" command is recognized, the main EPG program menu listing shown in FIG. 12A is displayed on the television screen and the user is prompted to make a selection. In general, the user may interact with the displayed listing using any or all of the following selecting techniques. First, the arrow keys on remote control 166 may be used to highlight one of the menu items. Second, an "UP" or "DOWN" command may be spoken to highlight one of the menu items. Third, the <Select>key on remote control 166 may be pressed to select the currently highlighted menu item. Fourth, a "SELECT" command may be spoken to select the currently highlighted menu item. Fifth, the numeric key <N> on remote control 166 may be pressed to select the $N^{th}$ menu item. Sixth, a "SELECT N" command may be spoken to select the $N^{th}$ menu item. Seventh, a "MENU ITEM NAME" command may be spoken to select the named menu item. Generally, the entire menu item name will be highlighted, indicating that it is available as a spoken command. For long menu item names, such as "Cable Terminal Setup", only a substring, for example, "Setup" may be highlighted to avoid long command phrases which may be inconvenient to speak (although they are easy to recognize). In this instance, the "Cable Terminal Setup" option may be selected by simply speaking "SETUP". The system may optionally be configured to recognize both the long command phrase and a substring for selecting a menu item. In addition, strings may be recognized which are close to, but do not exactly match a defined speech command. For example, if the user says "INFO", but the valid corresponding command is "INFORMATION", the speech recognizer may correctly interpret the speech as a normal function of its matching capability.

If the user selects the "What's On Cable" menu item using any of the selecting techniques described above and if the user is authorized to access the EPG, the "What's On Cable" menu shown in FIG. 12B is displayed on the television screen and the user is prompted to make a selection.

If, when the "What's On Cable" menu of FIG. 12B is displayed, the user selects the "Viewing Guide" menu item using any of the selecting techniques identified above, the electronic program guide of FIG. 11 is displayed on the television screen. Because of the nature of a grid-style display, the instant invention provides a set of spoken navigation commands that may be used for large scale movement within a grid. Thus, when the EPG is displayed, a user may activate the speech recognition interface and say "GOTO CHANNEL NUMBER" to move to the row specified by the channel number NUMBER and may say "GOTO TIME" to move to the column with the next occurrence of the specified TIME. The user may also speak "PAGE UP" and "PAGE DOWN" commands to page up and page down through the electronic programming guide. For finer navigation within a grid, the user may activate the recognition interface and speak the directional commands "MOVE UP", "MOVE DOWN", "MOVE LEFT", and "MOVE RIGHT" as appropriate until a desired channel and program of the viewing guide of FIG. 11 is highlighted. During this procedure, the television screen displays "Listening . . . " and the cursor or highlighted area is moved appropriately within one second after the corresponding directional commands are spoken. The user may also say "GOTO CHANNEL NUMBER AT TIME" and the highlighted area is then the row and column defined by the time TIME and channel number NUMBER.

Suppose the directional commands spoken by the user cause the viewing guide of FIG. 11 to highlight 7:00 P.M. ESPN "Golf." If the user then says "INFO", the viewing guide menu of FIG. 12C is then displayed and the user is prompted to make a selection. If the user selects the "Tune TV-To-Program" menu item using any of the selecting techniques described above and if the current time is during the selected program time, television 162-2 is tuned to the selected program.

If, when the viewing guide menu of FIG. 12C is displayed, the user selects the "Record Program" menu item using any of the selecting techniques described above, the record program screen of FIG. 12D is displayed. The record program screen of FIG. 12D prompts the user to select one of the displayed record menu items, i.e., "One Time", "Daily", "Weekly" or "Exit"(to exit the record program routine). If the user selects "One Time" using any of the selecting techniques described above, the confirmation screen of FIG. 12E indicating the recording schedule is displayed. If VCR 162-1 is not on, the user may activate the speech recognition interface and say "VCR POWER ON". VCR 162-1 is then turned ON if it is not already ON. The system may then check to verify that a cassette has been loaded into VCR 162-1 and prompt the user to load a cassette into VCR 162-1 if none is present. The system then appropriately records the selected program.

If, when the viewing guide menu of FIG. 12C is displayed, the user selects the "Provide-Information-On Program" menu item, a program description is displayed on the television screen.

The use of the "Favorite Channel" feature of the EPG will be discussed. If, when the "What's On Cable" menu of FIG. 12B is displayed, the user selects the "Favorite Channel" menu item using any of the selecting techniques described above and if the user has previously set up a favorite channels arrangement, the favorite channel guide of FIG. 12F is displayed on the television screen. The favorite channel guide is a grid display that is a subset of the entire EPG grid display containing the user's favorite channels. This subset is user-specified and can be as large as the full set of channels available, or as small as one channel. The user may then navigate and select from the favorite channel grid of FIG. 12F as discussed above with respect to the EPG of FIG. 11.

The "Channel Listings" feature of the EPG will be discussed. If, when the "What's On Cable" menu of FIG. 12B is displayed, the user selects the "Channel Listings" menu item using any of the selecting techniques described above, a channel listing of the available channels in the subscription television system such as shown in FIG. 12G is displayed on the television screen. The user may then select one of these by speaking the "MOVE LEFT", "MOVE RIGHT", "MOVE UP", and "MOVE DOWN" commands and then saying "SELECT" or by saying "GOTO CHANNEL NUMBER." Selecting a channel will tune the television to that channel.

The "Categories" feature of the EPG will now be discussed. If, when the "What's On Cable" menu of FIG. 12B is displayed, the user selects the "Categories" menu item using any of the selecting techniques described above, the screen of FIG. 12H is displayed. If, for example, the user selects the "Live Sports" menu item using any of the selecting techniques described above, the current EPG database is searched. If the EPG database contains information that fits in the selected category, the screen of FIG. 121 is displayed. If the user, for example, selects the "Baseball" menu item using any of the selecting techniques described above, the screen of FIG. 12J is displayed. The user can then select one of these menu items to tune the television to that program. If the EPG database contains no information that fits in the selected category, a message is displayed on the television screen which indicates that there are currently no programs in this category and the user is then prompted to return to the main menu of FIG. 12A. It is noted that the display of programs matching the selected category may be limited to those programs either currently showing or starting within some relatively short, pre-defined time period.

The second vocabulary also permits control of the functions of VCR 162-1. VCR playback control will now be discussed. It is assumed that power has been turned on to subscriber terminal unit 160, VCR 162-1, and television 162-2 either using the speech recognition interface and/or the buttons of remote control 166 or keyboard 122 of subscriber terminal unit 160. A video cassette is inserted into the cassette compartment of VCR 162-1. If the cassette has been properly loaded, a cassette icon, a "Cassette Loaded" message, and a prompt asking "Do You Wish To Play This Cassette Now?" are displayed on the television screen. If the user activates the speech recognition interface and says "OK", television 162-2 is tuned to channel 3 or channel 4 in accordance with the manufacturing code and the tape begins to play.

Control of the VCR fast-forward and rewind operations using the speech recognition interface will now be discussed. It is assumed that subscriber terminal unit 160, VCR 162-1, and television 162-2 are turned ON, that the cassette has been properly installed, and that the television has been tuned to channel 3 or channel 4, as appropriate. If a tape is currently playing and the user activates the speech recognition interface and says "VCR FASTFORWARD" or "VCR REWIND", subscriber terminal unit 160 sends a signal such as an IR signal via IR transmitter 216 to VCR 162-1 which results in the tape moving forward or backward. The user may then say "VCR STOP" or press the <Stop>key on remote control 166 and the tape stops playing. If the user then says "VCR FASTFORWARD" or "VCR REWIND", the tape is fastforwarded or rewound and television 162-2 is tuned to the last tuned channel. If the user does not say "VCR STOP" or press the <Stop>button on remote control 166, the tape will advance or be rewound all the way to the end. It should be noted that if the user has a remote control with a <Recognize>button, this button must be actuated when the user speaks commands subsequent to the first spoken command. If the spoken activation command is used, the speech recognition interface will be active for some predetermined time period after the activation command or the most recent command is spoken.

Control of the VCR pause and continue functions will now be discussed. Assuming that a tape is currently playing, if the user activates the speech recognition interface and says "VCR PAUSE", the subscriber terminal unit sends a signal such as IR signal via IR transmitter 216 to VCR 162-1 which causes the tape to be stopped and the tape counter to be displayed on the screen. If the user then says "VCR CONTINUE", the system sends a signal such as an IR signal via IR transmitter 216 which causes the tape to begin to play again. It should be noted that if the user has a remote control with a <Recognize> button, this button must be actuated when the user speaks the "VCR CONTINUE" command. If the spoken activation command is used, the speech recognition interface will be active for some predetermined time period after the activation command or the most recent command (i.e., "VCR PAUSE") is spoken.

The setting of a VCR to record a program using the speech recognition interface will now be discussed. It is noted that this discussion of VCR programming is based on a vocabulary which does not support program title commands, e.g., "RECORD STAR TREK." Other, simpler VCR programming methods are available with the more sophisticated vocabularies discussed below. For the purposes of this example, it is assumed that a user desires to record a TV program in SP mode on channel 7 in the first program position starting at 9:05 PM and stopping at 10:35 PM on Saturday, Dec. 17, 1994 and that the present time is 1:05 PM on Thursday, Dec. 15, 1994. Starting at the main menu of FIG. 12A, the user selects the "VCR-Program-Timer" menu item using any of the selecting techniques described above and the screen of FIG. 12K is displayed. If the user selects the "Use PLUS Codes" menu item using any of the selecting techniques described above, the screen of FIG. 12L is displayed. The user then states the appropriate VCR Plus (TM) code one digit at a time.

Returning the screen of FIG. 12K, if the user selects the "Set-Program-Timer" menu item using any of the selecting techniques described above, the screen of FIG. 12M is displayed. If the user then selects the "EPG Program VCR" menu item, the screen of FIG. 12B is displayed and VCR 162-1 may be programmed in accordance with the steps described above. If the user selects the "Voice Program VCR" menu item, the screen of FIG. 12N is displayed and the user is prompted to select a program number. If the user selects menu item (1), the screen of FIG. 12O is displayed and the user is prompted to state the day on which the program to be recorded is on. In accordance with the example set forth above, the user says "SATURDAY." In an alternative embodiment, a user could also say "DECEMBER SEVENTEENTH." This causes the screen of FIG. 12P to be displayed and the user is prompted to state the start hour, the start minute, and either AM Or PM. The user then says "NINE 0 FIVE PM". The screen of FIG. 12Q is then displayed and the user is prompted to state the stop hour, the stop minute, and either AM Or PM. The user then says "TEN THIRTY FIVE PM". The screen of FIG. 12R is then displayed and the user is prompted to state the channel that the program is on. The user then says "SEVEN". The screen of FIG. 12S is then displayed and the user is prompted to select the appropriate tape speed. After selecting the "SP" menu item in accordance with any of the selecting techniques described above, the screen of FIG. 12T is displayed. The screen of FIG. 12T prompts the user to verify that the entered information is correct. If the user says "OK", the screen of FIG. 12U is displayed for a predetermined period of time and the user is subsequently returned to the main menu of FIG. 12A.

Additional vocabulary data may be downloaded from head-end installation 125 to permit a user to speak commands using channel identifiers (e.g., CBS, NBC, ESPN, etc.) in addition to channel numbers. This additional vocabulary may be transmitted, for example, by an addressable transmission to subscribers who pay an additional service fee. An exemplary, but non-limiting example, of vocabulary suitable for this feature is set forth in Table III below.

TABLE III

| Family | Channel | HBO1 | HBO2 | HOT |
|---|---|---|---|---|
| International | ITV | Lifetime | Mainstreet | Cinemax |
| Disney | Court | MEU | MTV | Playboy |
| Nickelodeon | EPG | Prime | QVC | Rainbow |
| Request | Showtime | Shopping | Sneak | Spice |
| Hundred | Black | Classifieds | Trinity | Travel |
| TBN | TBS | The | Learning | Movie |
| Nashville | Network | TNN | Nostalgia | USA |

TABLE III-continued

| VH1 | PPV | Vision | Weather | A&E |
|---|---|---|---|---|
| Arts | American | AMC | BRAVO | Cartoon |
| CMTV | CNN | CNBC | Comedy | CSPAN |
| Discovery | E | Entertainment | ESPN | CBS |
| NBC | FOX | PBS | ABC | IND |
| Pay | WPIX | WGN | WWOR | Atlanta |
| Hits | Congress | Sports | Encore | |

It will be appreciated that this vocabulary will include identifiers for local stations in a particular system and that the vocabulary may be periodically updated to take into account changes in the offerings of a particular system.

In accordance with this additional vocabulary, the user may interface with the "What's on Cable" set of functions by proceeding directly to the network of choice using channel identifiers. Using this additional vocabulary, a user may use "GOTO CHANNEL IDENTIFIER" commands in addition to the "GOTO CHANNEL NUMBER" command discussed above. For example, a user may navigate the electronic programming guide of FIG. 11 by saying "GOTO ESPN" to move to the row specified by ESPN.

In accordance with an arrangement using a third vocabulary, EPG information provider 114-3 provides both EPG data and phonemic or template data corresponding to the EPG data to head-end installation 125. For purposes of the discussion below, it will be assumed that phonemic data corresponding to the EPG data is provided. Information provider 114-3 may, for example, use a text-to-speech/phoneme translator to generate the corresponding phonemic data. The EPG text data generally contains at least program title and description or description keyword data. Thus, EPG information provider 114-3 provides the program title and description data as well as phonemic data representing the spoken sounds or words constituting this program title and description or description keyword data. This phonemic data will hereinafter be referred to as "phonemic EPG data." ISP 42 thus receives the EPG data and the phonemic EPG data and transmits both the EPG and the phonemic EPG data to the subscriber terminal units of subscribers. Alternatively, ISP 42 may internally generate the phonemic EPG data using a text-to-speech converter for converting the received program title and description or description keyword data to phonemic data. In yet another variation, the phonemic data may be generated at the subscriber terminal unit itself. However, the text-to-speech converter is a relatively large software program and sufficient memory and processing power would have to be provided in the subscriber terminal unit to store and execute the program.

In the subscriber terminal unit, the recognizer executable code and the phoneme definitions which specify how each phoneme is recognized in terms of spectral or other signal content are stored in read-only memory. ISP 142 determines what individual words are used in the EPG title and description or description keyword data and generates a phonemic dictionary which maps those words to phonemes. ISP 42 downloads the EPG text and vocabulary definitions to the subscriber terminal units. The EPG text and phonemic dictionary are stored in RAM of subscriber terminal unit 160. For each full EPG title, the subscriber terminal unit generates the corresponding phonemic string using the phonemic dictionary. This phonemic string is then registered with the speech recognizer as a single recognizable utterance, i.e., it becomes an atomic part of the recognizer's vocabulary. The registration includes specifying an identifier for the phonemic string, which could be a numeric value or the text for the program name. When the recognizer determines that one of the utterances in the vocabulary has been spoken, it returns the utterance identifier to the subscriber terminal unit controlling routine and permits a search of the EPG data to find occurrences of the programs having the spoken title.

The above approach to title data may also be applied to keyword data. A user may be provided with the capability of searching on keywords (e.g., actors, rating, show type, year, director, etc.) which could be marked in the text by highlighting and registered for speech recognition and corresponding database searches. This is similar to the hypertext concept. Specifically, the recognizable words would be highlighted in the program description whenever it is shown on the screen to indicate that the user may search for other shows having the same keywords. It should be mentioned that when using keywords, the phonemes for the full descriptive text does not need to be downloaded, only the phonemes for the keywords themselves.

Thus, the speech recognition interface of the subscriber terminal units which receive the EPG data and the phonemic EPG data permit the user to search the EPG data for particular shows by saying the show name, as well as permitting a search of the program description of the EPG data using the above-described keyword concept for particular actors, actresses, etc.

For example, if the user is tuned to television video, commanding "FIND STAR TREK" will cause a search of the EPG data to be carried out and will tune that program if it is currently available, or tune the channel where it will next be available and provide a dialog box stating when it will begin. If the user has selected the electronic programming guide grid, commanding "FIND STAR TREK" will move to the grid location where the next occurrence of the program occurs. Repeating the command or saying "NEXT" will find the next subsequent instance of the program. The user can set up to record the program using the standard record from grid capabilities, i.e., saying "RECORD" will queue the program for recording and initiate the above-described display screen about how often, etc. Of course, the user can say "RECORD STAR TREK" directly from the tuned video to initiate the display screens about how often, etc.

As noted, the instant invention provides a hypertext-like keyword search feature. The searched keywords are part of the descriptive text for the programs as described above. The keywords are highlighted to indicate that they can be part of a search. The search can be initiated with a command such as "SEARCH KEYWORDS" which would bring up a display dedicated to that function. The user may then enter a command limiting the search, such as "ONLY MARILYN MONROE", assuming "Marilyn Monroe" is a valid keyword. The screen displays the restriction and indicates how many entries in the EPG database currently match the restriction. The user can then speak additional commands such as "ONLY MOVIES", "ONLY WITHIN 4 HOURS", "ONLY WESTERN". These commands limit the search to movies starring Marilyn Monroe which are comedies and westerns and occur within the next four hours. The screen displays these restrictions and reports how many matching items exist. When the user has created the desired list of matching items, he or she commands "SHOW LIST". This brings up a descriptive list of all matching items, if any. The user may then select an item for recording or viewing in the same manner as items from the programming guide grid. To implement this capability, ISP 142 generates a phoneme dictionary for each keyword in the same manner as it does for titles. This dictionary is then used by subscriber terminal unit 160 to tailor the vocabulary used by the speech recognition algorithm.

These searches are powerful tools which permit a user to extract very specific information from a large and complex data base using simple natural language voice commands. Of course, it will be readily apparent that this technique is not limited to subscription television systems, but may be applied in any system in which data is transmitted to a user. For example, in the case of financial data which is transmitted to a subscriber in a communication system, phoneme data representing stock identifiers may also be transmitted. This would permit a user to merely say "STOCK PRICE IBM" to generate a display of the current price of IBM stock. Another example is the use of downloaded catalogs for home shopping. By transmitting phoneme data representing different products available in the catalog, a user may say "ONLY MEN'S SUITS" to generate a display or listing of the men's suits which may be ordered from the catalog. The search could be further limited by the command "ONLY COLOR BLUE".

Another application of the search capabilities will now be discussed with reference to FIGS. 13A–13G. Suppose a college football fan is in a subscription television system which provides dozens of games, but the fan does not know which games are available or where to find it on the channel line-up. In accordance with the instant invention, a user activates the recognition interface and says "SEARCH." When the search screen of FIG. 13A appears, the user says "ONLY FOOTBALL." The screen of FIG. 13B indicates that there are 47 items which reference football in some way, i.e., football games, football documentaries, movies about football, and so on. This search is for all the items in the current program guide database, but the user only cares about football games taking place in the afternoon. Accordingly, to limit the search, the user may then say "ONLY SPORTS", after which the screen of FIG. 13C indicates that there are 42 matches. The user may then say "ONLY TODAY", after which the screen of FIG. 13D indicates that there are 23 matches. The user may then say "ONLY AFTER ELEVEN AM", after which the screen of FIG. 13E indicates that there are 19 matches. The user may then say "ONLY BEFORE SIX PM", after which the screen of FIG. 13F indicates that there are 12 matches. The user may then say "SHOW LIST" and the screen of FIG. 13G displays a list of programs which satisfy the search restrictions spoken by the user.

This list is stored in the memory of the subscriber terminal unit even after the screen of FIG. 13G is left. In one implementation, the creation of a new list destroys the previous list. However, it is within the scope of this invention to provide that a plurality of lists be stored in the memory of the subscriber terminal unit. When the user returns later in the day, he or she may activate the recognition interface and say "GOTO NEXT ON LIST" in order to step through each of the currently playing programs on the list created above. In accordance with the list created above and assuming the current time is 1:30 PM, when the user says "GOTO NEXT ON LIST", the Penn State-Notre Dame game on channel 10 would be tuned. If the user says "GOTO NEXT ON LIST", the Ohio State-Michigan game on channel 5 would be tuned. Whenever a program completes, it is removed from the list and the "GOTO NEXT ON LIST" command will no longer stop at the corresponding channel. Similarly, when an item on the list begins, it is added to the cycle.

When creating a list as described above, the search parameters can be specified in any order. Many useful search parameters will come from the program descriptive material in the EPG data, e.g., actor names, type of sporting event, names of teams, etc.

As noted, in the above discussion, EPG information provider 114-3 provides both the EPG data and the EPG phoneme data to ISP 142. However, ISP 142 may generate some or all of this EPG phoneme data using text-to-speech software programs available, for example, from VPC or Apple. In addition, the invention is not limited to EPG phoneme data. EPG template data, for example, may also be used.

The recognition of program titles also permits pay-per-view purchases to be made by speaking program titles as will be explained with reference to FIG. 14. If a user selects the "Pay-Per-View" menu item from the main menu of FIG. 12A using any of the selecting techniques described above, the pay-per-view screen of FIG. 14 is displayed. This screen lists all pay-per-view programs which may be purchased for viewing by the user. The user may then select one of the programs for purchase using any of the selecting techniques described above, including by speaking the title of the program. If the subscriber terminal unit is equipped with impulse-pay-per-view capabilities, billing data corresponding to the selected program may be stored in non-volatile memory and subsequently forwarded to head-end installation 125 via RF transmitter 229. Alternatively, a purchase transaction may be forwarded to head-end installation 125 via RF transmitter 229 and an authorization transaction responsive to this purchase transaction may then be forwarded to the subscriber terminal unit using any of the above-described transmission techniques. The pay-per-view operation may also be combined with the above-described keyword search techniques. Thus, the pay-per-view program list may be restricted by speaking "ONLY MOVIES", "ONLY TODAY", "ONLY SYLVESTER STALLONE", etc. as described above.

The vocabularies discussed above provide an enhanced user interface for controlling VCR 162-1 and television 162-2 by permitting a user to implement natural language control of these devices. The vocabularies also provide natural language control of the information flow from head-end installation 125. Thus, natural language is used to provide the ability to rapidly and conveniently search the large data stream. It will be appreciated that the vocabularies may be varied in accordance with the devices to be controlled. Thus, particular vocabularies for controlling electronic devices such as stereo receivers, audio cassette recorders, compact disc (CD) players, video disc players, video game players, and computers may be developed and downloaded to subscriber terminal units. Since the vocabularies are downloaded from head-end installation 125, large memories are not required for subscribers who desire a voice recognition interface only for basic television controls. The downloaded vocabularies also permit a system operator to offer various levels of control for different service fees.

As discussed above, an enhanced speech recognition interface may be achieved by providing features which improve the recognition rate of the commands spoken by the user. Such features include a command grammar; context-based recognition logic; using "next most likely" option when a command is apparently repeated; and preferring most likely words. While the benefits of the instant invention may be achieved even if these features are not implemented, the use of these features contributes to a more user-friendly interface. Thus, a command grammar may be used to define the manner in which the command vocabulary may combined into commands for controlling the controlled device.

An exemplary, but non-limiting, command grammar suitable for enhancing the voice recognition interface of the first vocabulary of Table I is VOLUME UP; VOLUME DOWN; SURF UP; and SURF DOWN. This command grammar requires that the word VOLUME must be followed by either the word UP or the word DOWN and that the word SURF must be followed by either the word UP or the word DOWN. Thus, if a user says the words "VOLUME OFF" after activating the recognition interface, main processor 200 uses the phonemic definitions and speech recognition software to compare the spoken "VOLUME OFF" with the phonemic data of the command vocabulary. The grammar limits comparisons to valid potential words. In this case, if the recognizer recognizes the word "VOLUME", it would then compare subsequent signals only to the words "UP" and "DOWN". Thus, "VOLUME OFF" would probably be interpreted as "VOLUME UP" since "UP" sounds more like "OFF" than does the word "DOWN". The only case in which the recognizer would know that it has failed is when it cannot even interpret the initial word of a command.

Further, the speech recognition interface may also be configured to provide context-based recognition logic. Thus, a context-based logic can be provided which determines that a command is inappropriate based upon restrictions outside the grammar. For example, a command to rewind the VCR might be correctly recognized, but be inappropriate if the VCR is not turned on. It is possible that the grammar could be continually updated to avoid such situations, but it may be easier to catch them outside the recognizer grammar. In another example, suppose a user has apparently chosen channel 60, but there is no video signal available on that channel. If there is video on channel sixteen, then tuning to channel sixteen would be a good context-based action.

More sophisticated possibilities may be implemented. For example, more people watch CBS than PBS, particularly when a football game is on. If the recognizer is not sure whether the viewer has selected one or the other, CBS should be preferred. Further, the context-based logic may be adaptive. If a particular household frequently tunes PBS rather than CBS, then the previous rule might be reversed. This household adaptive technique could be speaker-adaptive as well. Thus, each household member's voice could be recognized and the context-based logic tailored to them.

The "next most likely" option is based on a determination of command sequences which set forth the order in which commands are given and the likelihood one command following another in these sequences.

Figure 15:
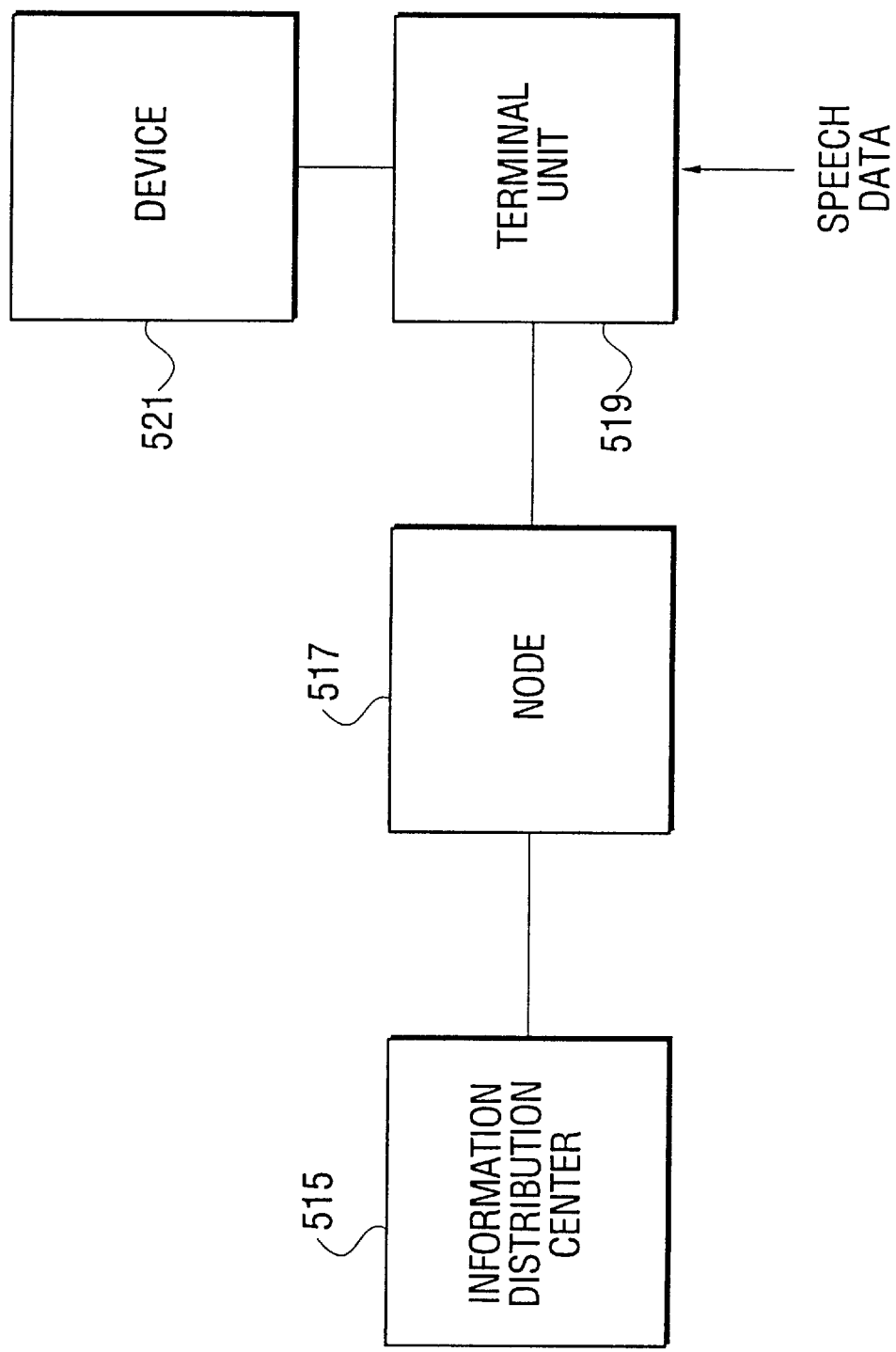
FIG. 15 is a block diagram of another system in which the speech recognition interface of the instant invention may be utilized.

Other variations to the invention may also be made. For example, although the speech recognition operation is shown in the above embodiments as taking place at the subscriber terminal unit, this processing could take place elsewhere in the system. One variation is shown in FIG. 15 in which a transmitter 515 transmits data representing sounds or spoken words to a node 517. Sounds or spoken words are received by a subscriber terminal unit 519. The sounds or spoken words are transmitted from subscriber terminal 519 to node 517 which includes speech recognition circuitry which uses the data transmitted from transmitter 515 to generate commands according to the sounds or spoken words. Node 517 transmits the command(s) to controlled device 521 via subscriber terminal unit 519 to control controlled device 521. If this arrangement is implemented in a subscription television system, for example, node 517 may be an off-premises device connected to a plurality of subscriber terminal units which access node 517 on a time-sharing basis.

While the invention has been described in detail with reference to the appended drawings, the invention is limited in scope only by the claims. Moreover, any application cited herein should be construed to be incorporated by reference as to any subject matter deemed essential to the present disclosure.

We claim:

1. A subscription television system, comprising:

a head-end installation for transmitting vocabulary data comprising phoneme data for defining a vocabulary of spoken commands;

subscriber terminal apparatus coupled to a television, said subscriber terminal apparatus including:

a microphone for detecting spoken command data;

a receiver for receiving the vocabulary data transmitted from said head-end installation; and a processor for executing a speech recognition algorithm using the vocabulary data received by said receiver to recognize spoken commands detected by said microphone and for controlling said television in accordance with the recognized spoken commands.

2. The subscription television system according to claim 1, wherein the vocabulary data comprises template data.

3. The subscription television system according to claim 1, wherein the vocabulary data defines a vocabulary of spoken commands which includes at least one command selected from the group of commands consisting of: powering on said television; powering off said television; tuning said television to a channel; increasing volume; and decreasing volume.

4. The subscription television system according to claim 1, wherein said head-end installation further transmits electronic programming guide information and said receiver further receives the transmitted electronic programming guide data.

5. The subscription television system according to claim 4, wherein the vocabulary data defines a vocabulary of recognized commands for accessing the electronic programming guide data.

6. The subscription television system according to claim 4, wherein the electronic programming guide information is displayed on said television in a grid having rows and columns and the vocabulary data defines a vocabulary of recognized commands which includes moving commands for moving in said grid.

7. The subscription television system according to claim 6, wherein the vocabulary data defines a vocabulary of recognized commands which further includes a record command for recording a program identified in said grid.

8. The subscription television system according to claim 6, wherein the vocabulary data defines a vocabulary of recognized commands which further includes a tune command for tuning to a program identified in said grid.

9. The subscription television system according to claim 6, wherein the vocabulary data defines a vocabulary of recognized commands which further includes an information command for displaying information regarding a program identified in said grid.

10. The subscription television system according to claim 6, wherein the vocabulary data defines a vocabulary of recognized commands which further includes program titles, whereby a program in said grid is selectable by title.

* * * * *

UNITED STATES PATENT AND TRADEMARK OFFICE
CERTIFICATE OF CORRECTION

PATENT NO. : 5,774,859
DATED : June 30, 1998
INVENTOR(S) : Peter B. Houser et al.

It is certified that error appears in the above-identified patent and that said Letters Patent is hereby corrected as shown below:

On the title page item 75 "Gloria J. Majid" should --Gloria J. Magid--'

Signed and Sealed this

Twenty-fifth Day of May, 1999

Attest:

Q. TODD DICKINSON

*Attesting Officer*          *Acting Commissioner of Patents and Trademarks*